(12) United States Patent
Lui et al.

(10) Patent No.: US 6,552,719 B2
(45) Date of Patent: *Apr. 22, 2003

(54) SYSTEM AND METHOD FOR AUTOMATICALLY SWITCHING BETWEEN WRITING AND TEXT INPUT MODES

(75) Inventors: Charlton E. Lui, Redmond, WA (US); Kathryn L. Parker, Fall City, WA (US); Dan W. Altman, Kirkland, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,172

(22) Filed: Jan. 7, 1999

(65) Prior Publication Data

US 2002/0011993 A1 Jan. 31, 2002

(51) Int. Cl.$^7$ .................................................. G09G 5/00
(52) U.S. Cl. ........................ 345/179; 345/173; 345/168
(58) Field of Search ............................... 345/179, 173, 345/174, 764, 773, 771, 168, 689, 864, 866; 178/18.01–18.07, 19.01–19.05; 707/531, 541

(56) References Cited

U.S. PATENT DOCUMENTS

| | | | | |
|---|---|---|---|---|
| 5,128,672 A | | 7/1992 | Kaehler ........................ 341/23 |
| RE34,476 E | * | 12/1993 | Norwood ..................... 382/181 |
| 5,276,794 A | * | 1/1994 | Lamb, Jr. .................... 707/507 |
| 5,367,453 A | * | 11/1994 | Capps et al. ................. 345/179 |
| 5,459,796 A | * | 10/1995 | Boyer .......................... 345/17 |
| 5,517,578 A | * | 5/1996 | Altman et al. ............... 382/181 |
| 5,528,743 A | * | 6/1996 | Tou et al. .................... 707/541 |
| 5,555,363 A | * | 9/1996 | Tou et al. .................... 345/863 |
| 5,777,605 A | * | 7/1998 | Yoshinobu et al. .......... 345/173 |
| 5,914,707 A | | 6/1999 | Kono ........................... 345/173 |
| 5,936,614 A | * | 8/1999 | An et al. ...................... 345/173 |
| 6,018,335 A | | 1/2000 | Onley et al. |
| 6,094,197 A | | 7/2000 | Buxton et al. ............... 345/358 |
| 6,128,007 A | * | 10/2000 | Seybold ....................... 345/179 |
| 6,169,538 B1 | | 1/2001 | Nowlan et al. |
| 6,199,125 B1 | | 3/2001 | Cortesi |
| 6,295,372 B1 | * | 9/2001 | Hawkins et al. ............. 345/156 |

FOREIGN PATENT DOCUMENTS

| | | |
|---|---|---|
| JP | 1-191226 | 8/1989 |
| JP | 8-22385 | 1/1996 |

* cited by examiner

*Primary Examiner*—Richard Hjerpe
*Assistant Examiner*—Alexander Eisen
(74) *Attorney, Agent, or Firm*—Law Offices of Albert S. Michalik, PLLC

(57) ABSTRACT

A method and system for automatically determining when an application should switch from a writing mode to a text entry mode, and vice-versa. When a soft input panel (SIP) or input method (IM) is selected, the application is notified and enters a text entry mode. Inputting via the IM while in this mode causes a character to be sent to the application, while pen events in the application window enable text editing and the selection of text and ink data in the application widow. When the SIP is deselected, the application is notified and enters a pen (writing) mode, whereby the pen events are interpreted as digital ink strokes instead of characters. Sub-modes of the pen mode are also available, via which the pen events are used to manipulate existing ink in the application window. Visual feedback may be provided to remind the user of the current mode and/or sub-mode.

12 Claims, 22 Drawing Sheets

US 6,552,719 B2

SYSTEM AND METHOD FOR AUTOMATICALLY SWITCHING BETWEEN WRITING AND TEXT INPUT MODES

TECHNICAL FIELD

The invention relates generally to computer systems, and more particularly to the input of data into a computer system.

BACKGROUND OF THE INVENTION

Small, mobile computing devices, including hand-held and palm-size computers and the like, are becoming important and popular user tools. In general, they are becoming small enough to be extremely convenient while consuming less and less battery power, and at the same time becoming capable of running more powerful applications.

Although such devices continue to shrink in size, size limitations are being reached as a result of human limitations. For example, a full character keyboard that enables user data input cannot be so small that human fingers cannot depress the individual keys thereon. As a result, such devices (e.g., palm-size computers) may eliminate the full size physical keyboard and provide a representation of a keyboard on a touch-sensitive display. To this end, the user enters characters by touching the screen with a stylus at locations corresponding to the displayed keys. Of course, touch-screen devices can also be used simultaneously with devices having physical keyboards, whereby characters can also be entered by manually pressing the keys of the physical keyboard.

Alternatively, the user may wish to input handwritten notes such as sketches and other writing to the device. Applications are known that receive pen movements as digital ink, and the ink is displayed as it is input. The application may store the digitized ink as is, or the application may interpret some of the ink, e.g., it may attempt character recognition, and then store the interpretation as ASCII text or the like.

One of the difficulties in working with such applications is that the user may wish to enter text (e.g., by tapping a keyboard) at certain times, and write digitally (by dragging the pen) at other times. Contemporary devices presently force the user to manually switch between a distinct text entry and a drawing application, or mode, with no intuitive mixing of text and graphics. Moreover, while in each application or mode, the same type of pen stroke may be interpreted different ways. For example, if the user is in a writing application, the dragging of the pen may be used at one time to input ink, and at another time to select a section such as for cutting or pasting purposes. In a text application, the dragging of the pen may select text. In sum, contemporary application and/or mode switching is neither convenient nor intuitive to users, yet heretofore was needed to inform the system of the user's intentions so as to handle pen events in the manner desired by the user.

SUMMARY OF THE INVENTION

Briefly, the present invention provides a method and system for modifying the computer system to receive text input or writing (pen or ink) input based upon the selected or deselected state of an input panel selected by the user. When the system receives a user request to select an input panel, a text entry mode of an application program is enabled in response to the request, including displaying visual feedback indicative of the text entry mode. As data input such as in the form of user pen events are received on the input panel, the pen events are passed to an input method corresponding to the input panel, which converts the user pen events into text. The text is then passed as input data to a program. While in the text entry mode, pen events received in the program's window are passed to the program to enable editing.

When a request to deselect the input panel is received, the text input state is automatically disabled, including displaying visual feedback indicative of the disabled text input state, and a writing input mode is automatically enabled in the application program. The writing input mode includes displaying visual feedback to the user indicative of the writing input state. When user pen events are received, the pen events are passed as input data to the program. The program interprets the pen events as digital ink, or, if in a user-selected sub-mode of the writing/pen mode, interprets the pen events as an ink editing operation.

Thus, the switching of modes is automatic based on the state of an input panel, which is intuitively selected by the user. Visual feedback may also be provided to remind the user of the current mode. The state of the input panel determines how pen events will be handled, in that if the input panel is in a non-selected state, the pen events are passed as input data to the program. If the input panel is in a selected state, the pen events are passed to an input method of the input panel window, resulting in text being received from the input method. The text is then passed as input data to the program.

Other advantages will become apparent from the following detailed description when taken in conjunction with the drawings, in which:

DETAILED DESCRIPTION OF THE PREFERRED EMBODIMENT

Exemplary Operating Environment

Figure 1:
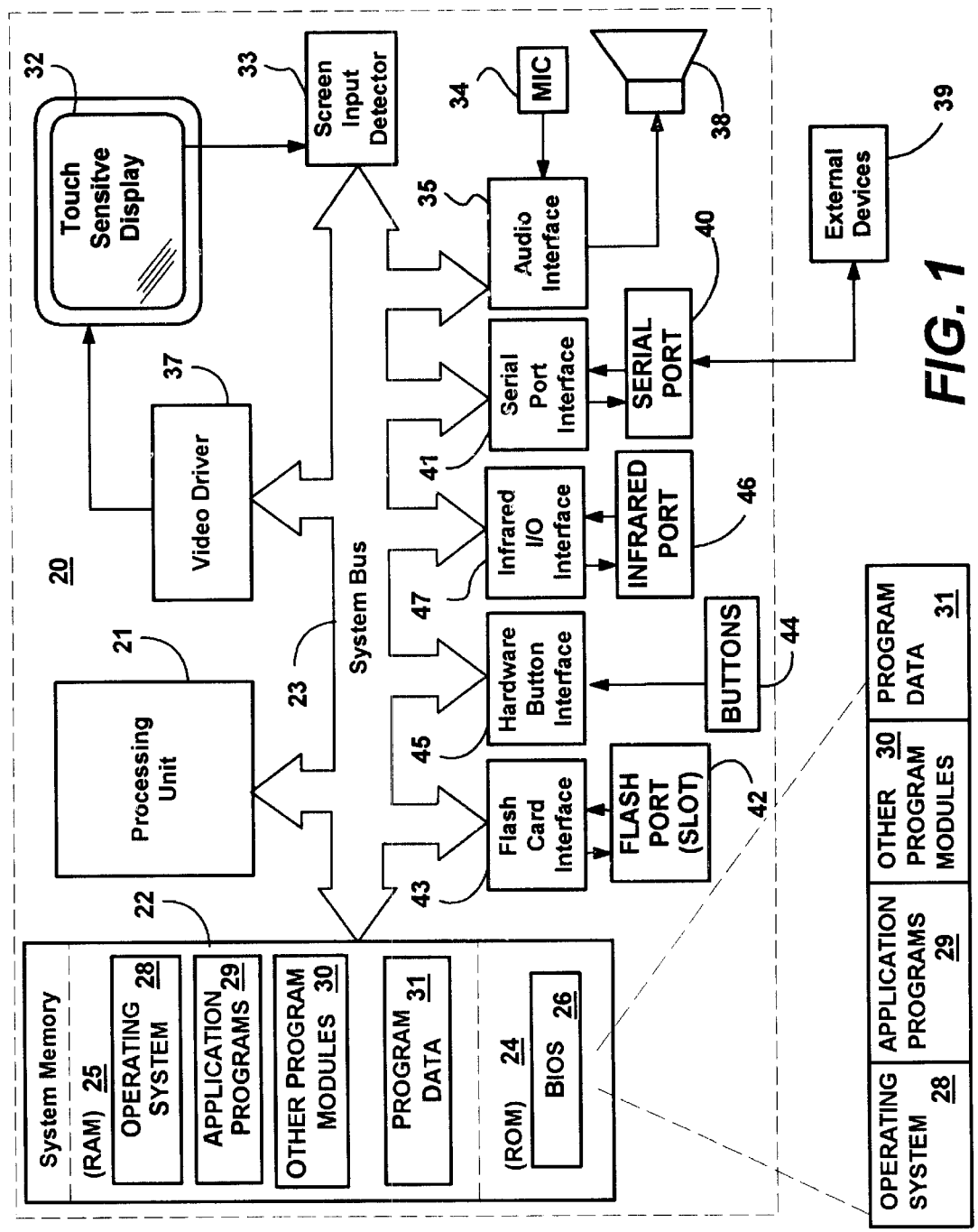
FIG. 1 is a block diagram representing a computer system into which the present invention may be incorporated.

FIG. 1 and the following discussion are intended to provide a brief, general description of a suitable computing environment in which the invention may be implemented. Although not required, the invention will be described in the general context of computer-executable instructions, such as program modules, being executed by a hand-held computing device such as a mobile device. Generally, program modules include routines, programs, objects, components, data structures and the like that perform particular tasks or implement particular abstract data types.

Moreover, those skilled in the art will appreciate that the invention may be practiced with other computer system configurations, including palm-sized, desktop or laptop personal computers, mobile devices such as pagers and telephones, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a hand-held personal computing device 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the hand-held computer 20, such as during start-up, is stored in the ROM 24.

Figure 2:
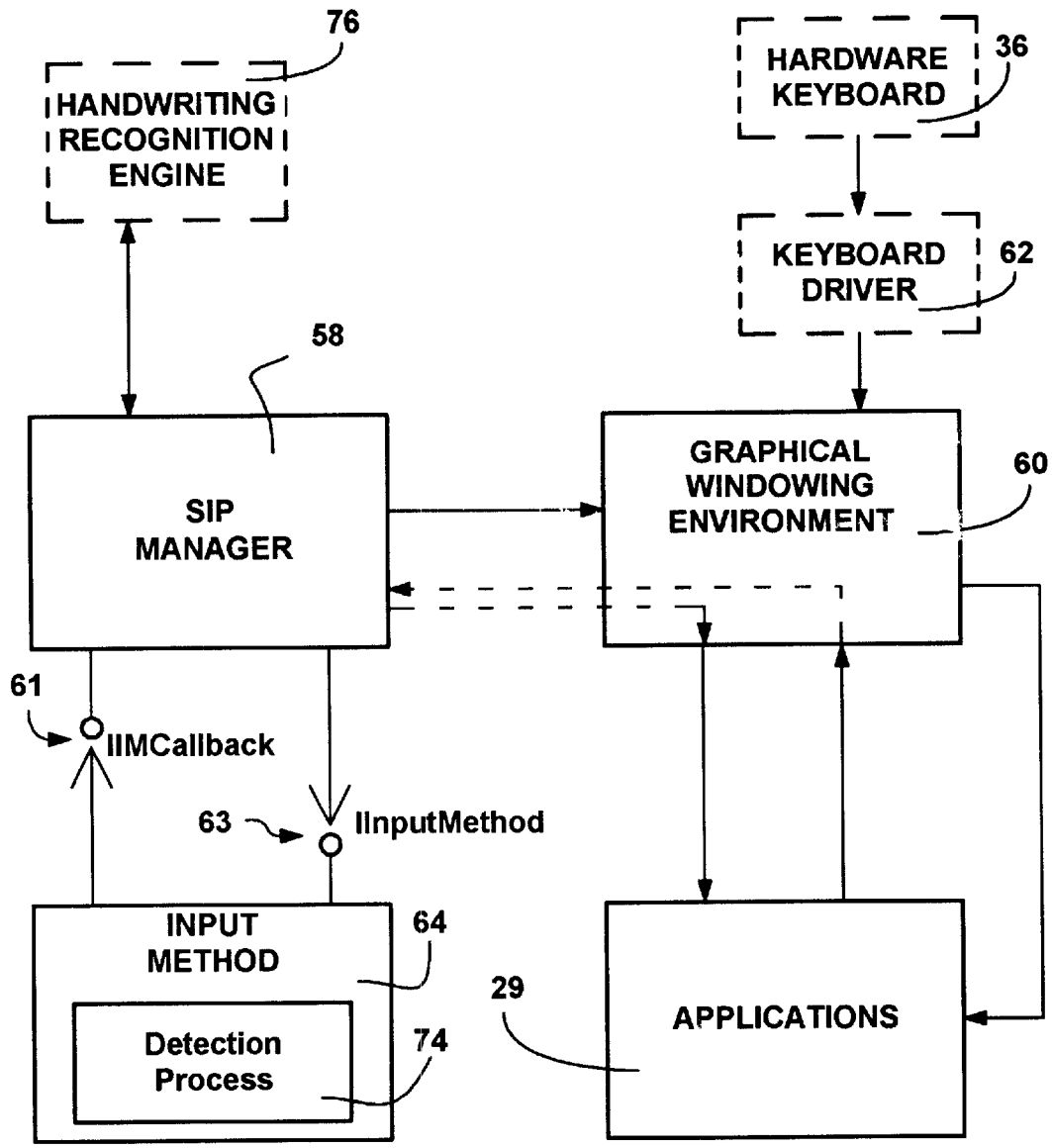
FIG. 2 is a block diagram representing an underlying system architecture into which the present invention may be incorporated.

A number of program modules are stored in the ROM 24 and/or RAM 25, including an operating system 28 (preferably Microsoft Corporation's Windows® CE operating system), one or more application programs 29, other program modules 30 and program data 31. A user may enter commands and information into the hand-held computer 20 through input devices such as a touch-sensitive display screen 32 with suitable input detection circuitry 33. Other input devices may include a microphone 34 connected through a suitable audio interface 35 and a physical (hardware) keyboard 36 (FIG. 2). The output circuitry of the touch-sensitive display 32 is also connected to the system bus 23 via video driving circuitry 37. In addition to the display 32, the device may include other peripheral output devices, such as at least one speaker 38 and printers (not shown).

Other external input or output devices 39 such as a joystick, game pad, satellite dish, scanner or the like may be connected to the processing unit 21 through an RS-232 or the like serial port 40 and serial port interface 41 that is coupled to the system bus 23, but may be connected by other interfaces, such as a parallel port, game port or universal serial bus (USB). The hand-held device 20 may further include or be capable of connecting to a flash card memory (not shown) through an appropriate connection port (e.g., slot) 42 and interface 43. A number of hardware buttons 44 such as switches, buttons (e.g., for switching application) and the like may be further provided to facilitate user operation of the device 20, and are also connected to the system via a suitable interface 45. An infrared port 46 and corresponding interface/driver 47 are provided to facilitate communication with other peripheral devices, including other computers, printers, and so on (not shown). It will be appreciated that the various components and connections shown are exemplary and other components and means of establishing communications links may be used.

Soft Input Panel

The soft input panel architecture is primarily designed to enable the input of text such as character, key-based and other user data via the touch screen 32 of the device 20 rather than a physical keyboard 36. However, as can be appreciated, a given computer system 20 may optionally and additionally include a physical keyboard, as represented by the dashed box 36 of FIG. 2. Moreover, as will become apparent, the "soft input panel" need not be an actual touch-sensitive panel arranged for directly receiving input, but may alternatively operate via another input device such as the microphone 34. For example, spoken words may be received at the microphone 34, recognized, and displayed as text in an on-screen window, e.g., a soft input panel.

FIG. 2 shows a block diagram implementing the SIP architecture. The computer system 20 includes an operating system 28 such as the graphical windowing environment 60. Such a graphical windowing environment 60 is generally operational to receive user input through a variety of devices including the keyboard 36, a mouse (not shown), a digitizer (not shown) and so on. In turn, the graphical windowing environment 60 may provide such user input to an application having "input focus," frequently in the form of a keyboard character event. Note that a number of applications 29 may be executable by the computer system, however one application that is currently running is said to have "input focus" and receive the input.

The preferred architecture employs a SIP manager 58 to provide a single and flexible interface for a plurality of different input methods 64. In general, the SIP manager 58 provides text in the form of encoded keystrokes from a selected input method 64 to the graphical windowing environment 60 (e.g., the Windows CE operating system 28). Once received, the graphical windowing environment 60 sends information corresponding to the user input data to an application 29 (i.e., the application whose window currently has input focus) in the form of that keystroke, mouse or other message placed in the message queue of the application's window. The passing of such messages is well known in Windows programming and is described in "Programming Windows 95," Charles Petzold, Microsoft Press (1996), hereby incorporated by reference. As a result, any application capable of handling text input (e.g., in the form of ASCII or Unicode characters) may be used with any appropriately-configured input method 64. Indeed, if an optional keyboard 36 is present, keystrokes are directly provided by a keyboard driver 62 to the graphical windowing environment 60, whereby appropriate keystrokes are likewise placed in the message queue of the active application's window without the application being provided with information as to the source.

Input methods 64 may include, for example, various different displayable keyboards, (soft keyboards), a calculator, a formula and/or equation editor, chemical symbol template, voice recognition, handwriting recognition, shorthand symbol recognition, or other application-optimized input methods (e.g. a barcode reader). The SIP manager 58 provides a user interface for permitting a user to toggle a SIP window (panel) 50 (FIG. 7) between a selected (opened) and deselected (closed) state, as described in more detail below. The SIP manager 58 also provides a user interface enabling user selection from a displayable list of available input methods. A user interacting with the user interface may select an input method 64, and in response, the SIP manager 58 loads and calls the selected input method 64. In a preferred embodiment, each of the input methods communicates with the SIP manager 58 through a COM (Component Object Model) interface shown as IIMCallback 61 and IInputmethod 63. A COM object comprises a data structure having encapsulated methods and data that are accessible through specifically defined interfaces. A detailed description of COM objects is provided in the reference entitled "Inside OLE," second edition, Kraig Brockschmidt (Microsoft Press), hereby incorporated by reference.

Generally, when the SIP window 50 is toggled between the selected and deselected states, as will be described in more detail below, the SIP manager 58 informs the selected input method 64 to correspondingly open/close the SIP window 50 through the IInputmethod mechanism 63. When a new input method is selected, the SIP manager 58, through the mechanism 63, informs any of the previously selected input methods to exit, and loads the newly selected input method. The interface 63 may also be utilized by the SIP manager 58 to obtain information specific to a selected input method, as also described in detail below.

The selected input method 64 may also communicate information to the SIP manager 58 via the IIMCallback mechanism 61, such as which character or characters were entered by a user, irrespective of whether the character or characters are generated through keyboard selection, handwriting recognition, voice recognition, a formula editor, calculator or the like. Such text input is generally passed to the SIP manager 58, preferably received as (or converted to) a Unicode character (for Windows CE) by the SIP manager 58 and output to the graphical windowing environment 60. Command key information, such as "Ctrl" on a keyboard, may also be provided by the input method 64 to the SIP manager 58 via interface 61.

SIP and input method-specific information may also be communicated through the SIP manager 58, and ultimately to the focused application 29, when the application is optimized for operating with a SIP (i.e., is "SIP-aware") as described in more detail below.

Figure 3:
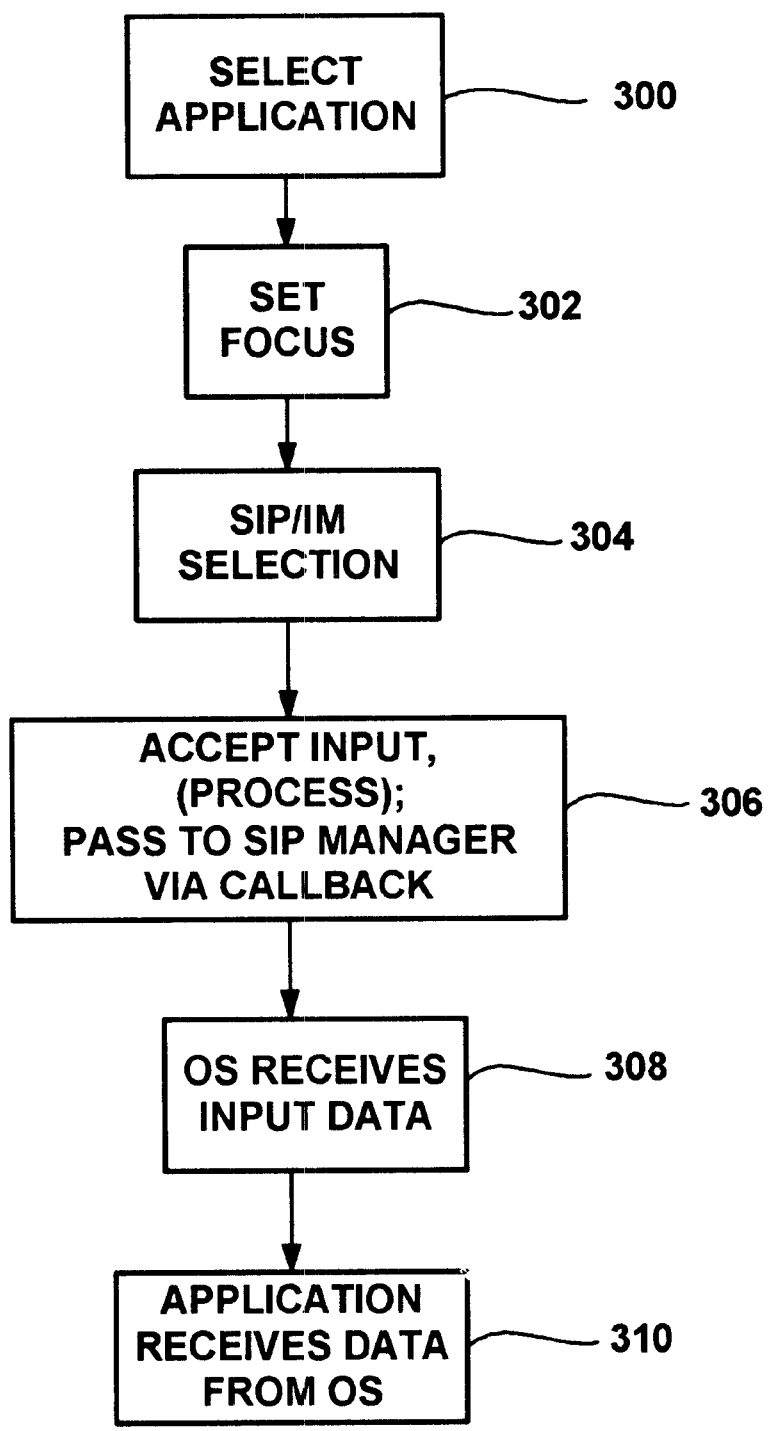
FIG. 3 is a flow diagram generally representing a process for getting user input from an input method to a selected application.

The system operates as generally represented in the steps of FIG. 3. Once an application is selected and has focus (steps 300–302), an input method 64 is selected therefor at step 304. Note that the input method 64 may be selected by the user, or a default input method may be selected for use with a particular application. Additionally, the input method 64 may be one that remains after having been selected for a previous application, i.e., a particular input method stays the same as the user switches between various applications. It is also possible to deselect all input methods, whereby the input data may be sent to an application program 29 without conversion to text. However, if any input method 64 is selected, the SIP window 50 is displayed.

As the user inputs data at step 306, appropriate data is passed to the SIP manager 58 via the IIMCallback mechanism 61, described below. Note that the input method 64 ordinarily first processes the received data at step 306 and converts the data to text. By way of example, one particular input method 64 may convert barcode symbols to Unicode characters representing digits, another input method may convert mathematical entries into a Unicode result (e.g., an entry of '3+6=' sends a '9' to the SIP manager 58), while yet another may be an equation editor (e.g., the characters "Sqrt" are converted into a single Unicode value representing a square root symbol). In a typical example, a keyboard-type input mechanism converts user input data received as screen coordinates to a Unicode character that corresponds to the location that the displayed keyboard was contacted. After any such processing, the input method 64 passes the text/character to the SIP manager 58, which in turn passes those digits to the graphical windowing environment 60 (step 308). At step 310, the application 29 receives the character data from the graphical windowing environment 60 as if the user had entered those digits on a physical keyboard, regardless of the input method used.

Figure 4:
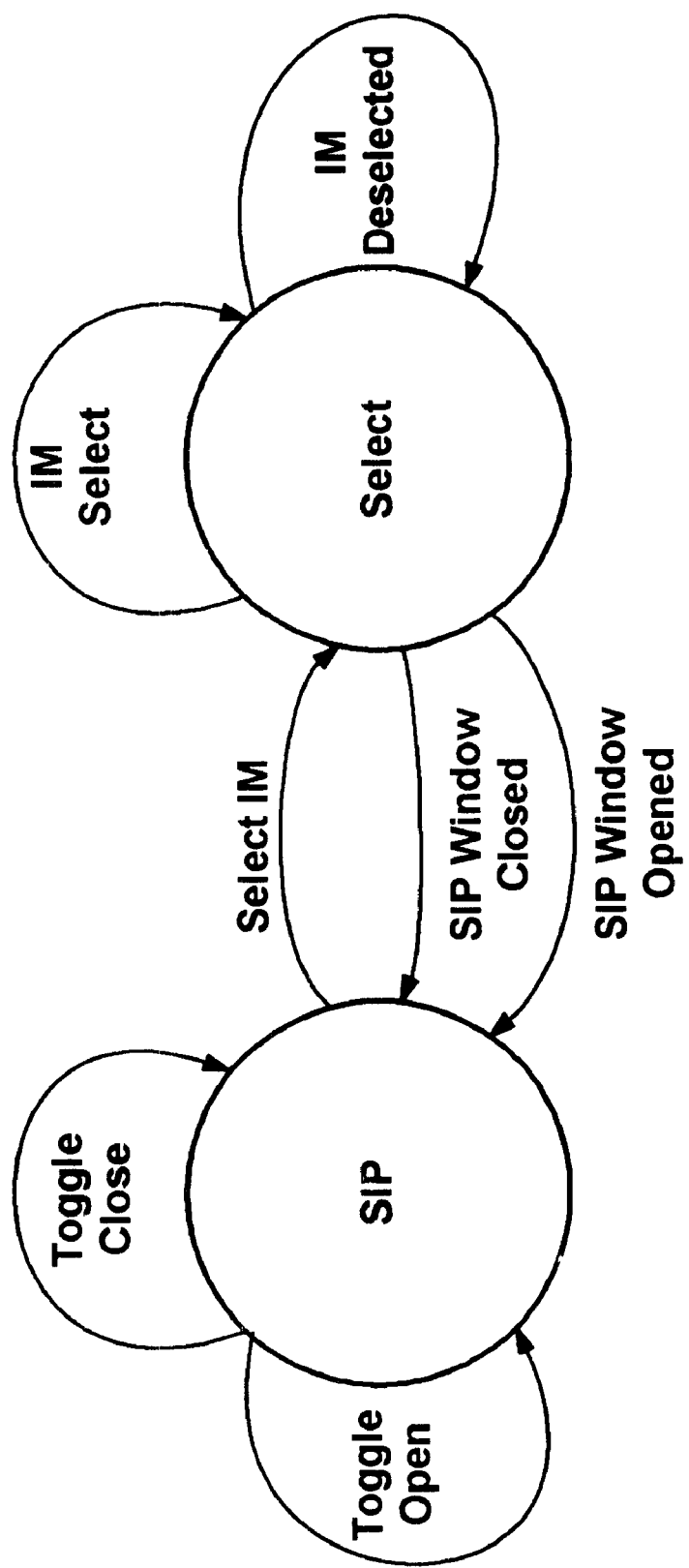
FIG. 4 is a state diagram generally representing SIP selection states.
Figure 5:
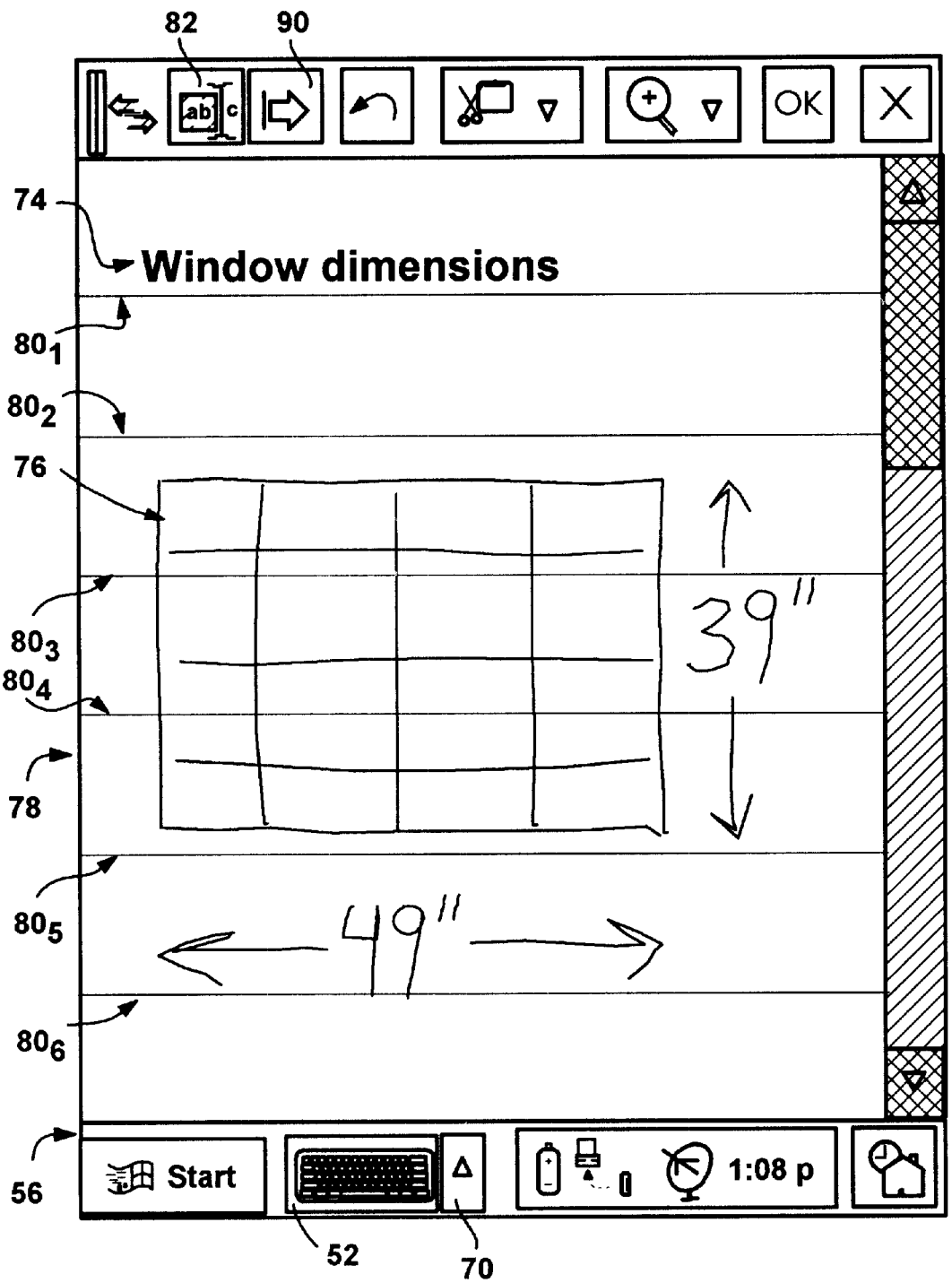
FIG. 5 represents a display on a touch-sensitive display screen on an exemplary computing device showing an application for handling both text and ink input.
Figure 6:
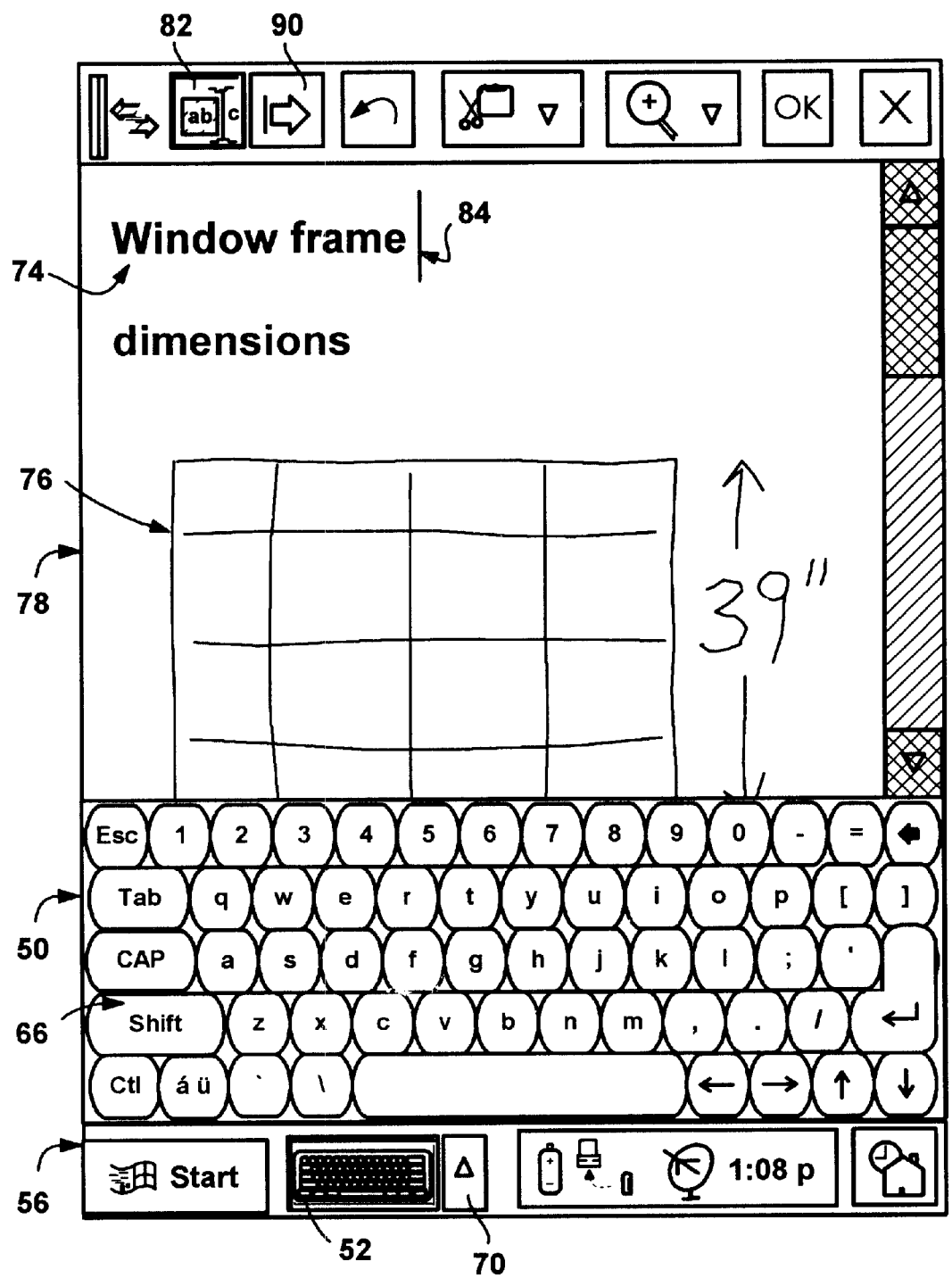
FIG. 6 represents a display on a touch-sensitive display screen showing the application of FIG. 5 wherein the text entry mode has been entered via selection of a Soft Input Panel (SIP)
Figure 7:
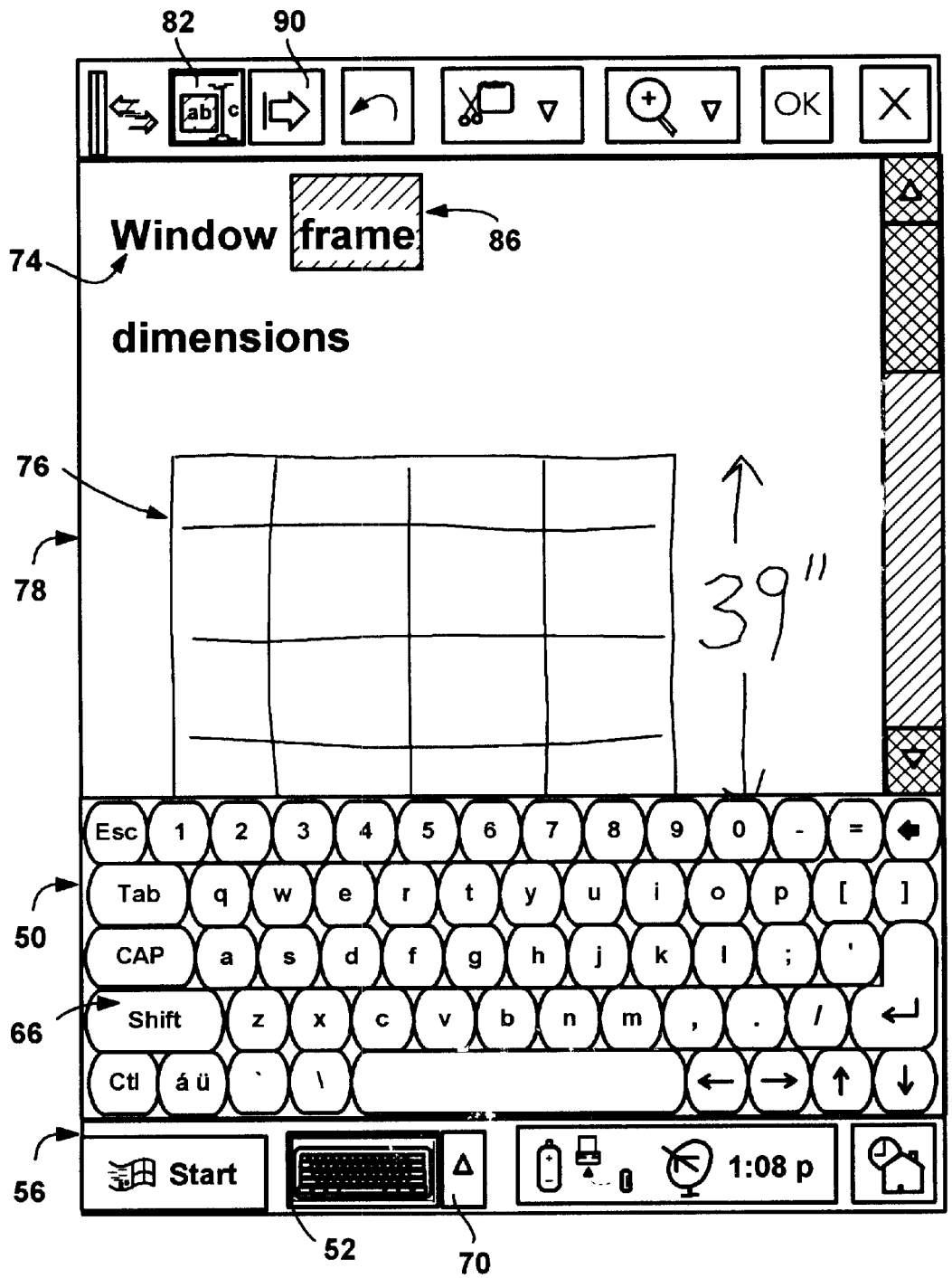
FIGS. 7 and 8 represent a display on a touch-sensitive display screen showing text editing operations while in the text entry mode.

As shown in FIGS. 5–7, the soft input panel (SIP) functionality of the system collectively includes a selectable window 50 (FIG. 7), a visible SIP button 52, and various methods and functions (described below). As shown in FIG. 7, the SIP window 50 is a rectangular area provided by the input method 64 that can be deselected and hidden, or selected and shown, at the user's (or an application program's) request. The visible SIP button 52 is located on a taskbar 56 or the like, and provides a touch-sensitive interface by which the user selects or deselects the SIP window 50. Thus, as represented in the state diagram of FIG. 4, the window 50 toggles between an open, visible state (FIG. 7) and a closed, hidden state (FIG. 5) as the user taps the SIP button 52. A present design implements a SIP window 50 that is fixed (docked) on the display 32 at a position just above the taskbar 56. As will become apparent below, the soft input panel design supports other SIP window 50 sizes or positions.

To this end, the operating system 28 creates a dedicated thread (the SIP manager 58) that registers itself as a SIP thread with the Windows CE system. The thread creates the SIP window 50, performs other SIP initialization, and then enters a message loop to respond to messages and user interface activity in the SIP window 50. The thread also serves to dispatch messages to an Input Method's window, and calls into the Input Method 64 to permit the Input Method 64 to create windows that will respond as special SIP windows.

The SIP manager thread 58 is given special status by the system. For example, windows created by the SIP manager 58 thread are topmost windows, and ordinarily will not be obscured by other windows, except, e.g., when the taskbar 56 is activated in an auto-hide mode while the SIP window 50 is displayed. In this case, the SIP window 50 remains displayed in its current location and the taskbar 56 is displayed on top of the SIP window 50. More generally, any user interface element for controlling the SIP may (and should) be placed on top of (rather than underneath) the SIP window 50, whenever the controlling user interface element and the SIP window 50 overlap.

Moreover, when tapped on, the SIP window 50 (and any child windows thereof such as pushbuttons, text entry fields, scrollbars and the like) will not receive the input focus as would conventional program windows. In this manner, the user may interact with the SIP window 50 without changing the system focus. As can be appreciated, changing the system focus each time the user inputs data into the SIP window 50 would be undesirable. The SIP button 52 will also not cause a change of focus for the same reason, i.e., it is undesirable to cause the window with focus to lose focus by tapping on the SIP button 52 to bring out the SIP window 50.

The SIP system enables the selective installation of a specified Input Method 64. As generally described above, each Input Method 64 is an interchangeable component by which the user provides character, text or other user data via the touch-screen display (or some other input device). More particularly, the SIP manager 58 preferably exposes a COM interface that enables the selective installation of Input Methods 64. The Input Method 64 occupies space inside a SIP window 50 created by the system.

Preferably, the Input Method 64 comprises a Component Object Model (COM) object that implements the IInputMethod interface. Notwithstanding, the Input Method 64 and SIP manager 58 can comprise virtually any components capable of communicating with one other through some mechanism, such as by receiving, responding to, and making function calls.

The Input Method 64 is responsible for drawing in the SIP window 50 and responding to user input in the SIP window 50. Typically, the Input Method 64 will respond to user input and convert that input into text which is then sent to the SIP manager 58 via exposed SIP functions. By way of example, one Input Method 64 includes a default QWERTY (alpha) keyboard 66 shown in FIG. 7. More particularly, this Input Method 64 displays an image of the keyboard 66 on the screen 32, and converts taps on that keyboard 66 (detected as screen coordinates) into Unicode characters which are sent to the SIP manager 58 and thereby to the system. Input Methods may be written by application vendors, and are added to the system using COM component installation procedures.

The user interacts with the Input Method 64 manifested in the visible SIP window 50 to create system input. As represented by the state diagram of FIG. 4 and as shown in FIG. 6, the user can select a different Input Method by tapping a SIP menu button 70 on the taskbar 56 that provides a pop-up list (not shown) of available input methods. The user can also select among available Input Methods via a control panel applet (not shown) or the like. The SIP control panel applets communicate with the operating system 28 using the registry and the exposed SIP-aware functionality described below.

As will be described in detail below, the various components cooperate to expose functions, structures, and window messages that enable system applications 29 to respond to changes in the SIP state. An application 29 that uses this functionality to adjust itself appropriately to SIP changes is considered "SIP-aware." Other applications may be SIP-aware yet choose to retain their original size (and thus be partially obscured by the SIP window 50) when appropriate. Moreover, and as also described below, there are exposed functions that enable applications to programmatically alter the SIP state.

Notwithstanding, applications 29 need not be aware of the SIP system in order to benefit from the present invention. Indeed, applications do not ordinarily recognize whether data received thereby originated at a hardware input device such as the keyboard 36 or via user activity (e.g., contact or proximity detected by the screen 32 and detection circuitry 33) within the soft input panel window 50. This enables applications to operate with virtually any appropriate input method, irrespective of whether that application is SIP-aware.

Turning to an explanation of the mechanism that facilitates the operation of an Input Method 64 installed by the SIP manager 58, a SIP-aware application 29 is notified when the SIP window 50 changes state and what the new, current state of the SIP window 50 is. The state includes whether the status of the SIP window 50 is visible or hidden, whether the SIP window 50 is docked or in a floating condition, and the size and position of the SIP window 50. As shown in the table below, a data structure (SIPINFO) contains this SIP information:

```
Typedef struct {
        DWORD cbSize
        DWORD fdwFlags
        RECT rcVisibleDesktop
        RECT rcSipRect
        DWORD dwImDataSize
        Void *pvImData
} SIPINFO;
```

The cbSize field may be filled in by the application program 29 and indicates the size of the SIPINFO structure. This field allows for future enhancements while still maintaining backward compatibility, and indeed, the size of the SIPINFO structure may be used to indicate the version to the components of the system. The fdwFlags field represents the state information of the SIP window 50, and can be a combination of three flags. A SIPF_ON flag that is set indicates that the SIP window 50 is visible (i.e., not hidden), while a set SIPF_DOC flag indicates the SIP window 50 is docked (i.e. not floating). A set SIPF_LOCKED flag indicates that the SIP window 50 is locked, i.e., the user cannot change its visible or hidden status. Note that a given implementation may not allow floating or locked SIP windows, however the capability is present within the system.

The rcVisibleDesktop field contains a rectangle, in screen coordinates, representing the area of the screen desktop 68 not obscured by the SIP window 50. If the SIP window 50 is floating (not docked), this rectangle is equivalent to the user-working area. Full-screen applications wishing to respond to SIP window 50 size changes can generally set their window rectangle data structure ("rect") values to this RECT data structure's values. If the SIP window 50 is docked and does not occupy an entire edge (top, bottom, left or right), then this rectangle represents the largest rectangle not obscured by the SIP window 50. However, the system may provide available desktop space 68 not included in the RECT data structure.

Next, the rcSipRect field contains the rectangle, in screen coordinates, representing the size and location of the SIP Window 50. Applications 29 will generally not use this information, unless an application 29 wants to wrap around a floating SIP window 50 or a docked SIP window 50 that is not occupying an entire edge.

The dwImDataSize field contains the size of the data pointed to by the PvImData member, which is the next field, i.e., a pointer to the Input Method-specific data. The data are defined by the Input Method 64.

Figure 9:
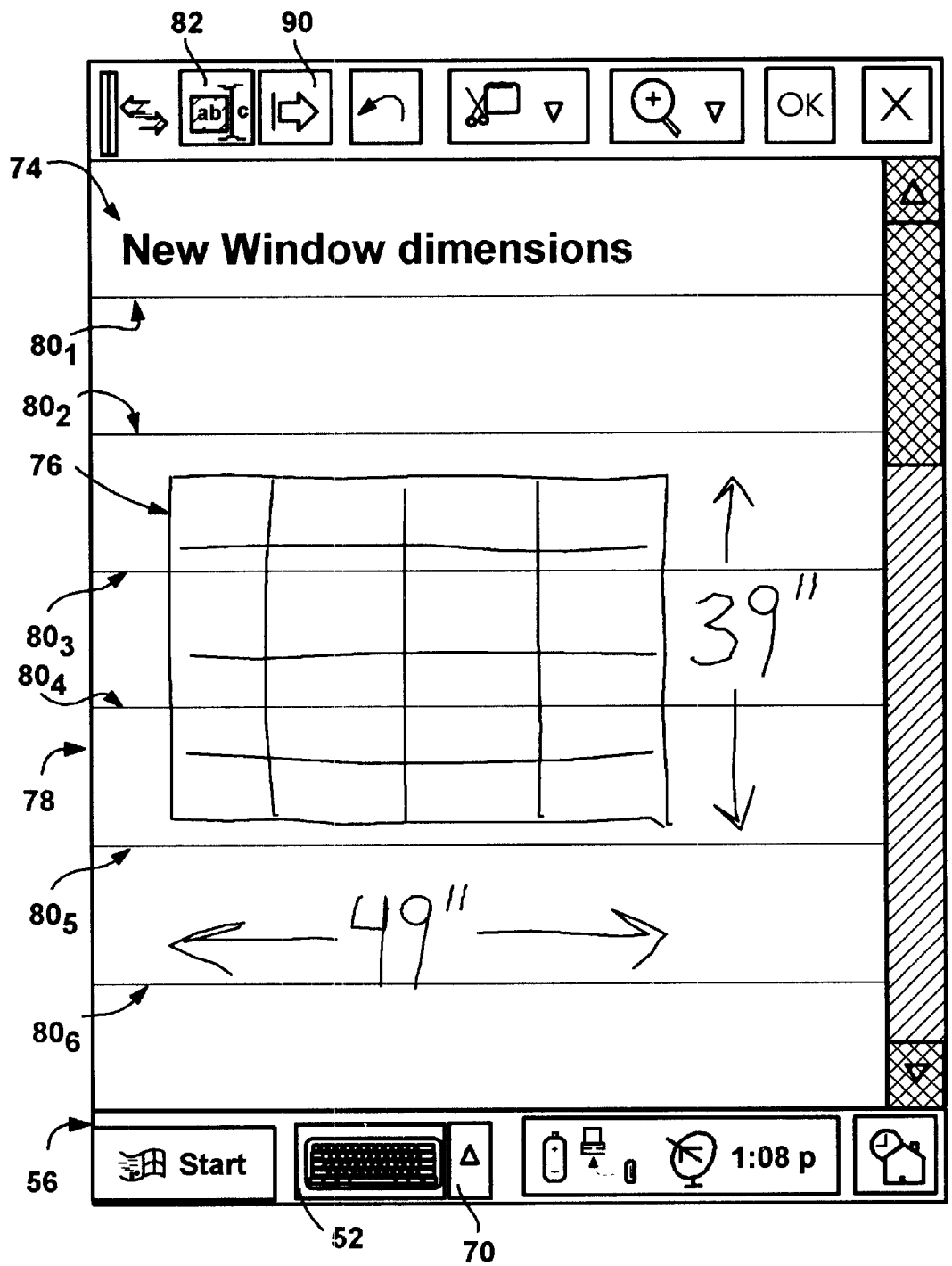
FIG. 9 represents a display on a touch-sensitive display screen showing the application of FIG. 5 wherein the writing/pen mode has been entered via de-selection of the SIP.

Whenever the state of the SIP window 50 changes, e.g., the SIP is deselected, a new Input Method has been selected and/or a visibility, docking or size change has occurred, a message, WM_SETTINGCHANGE, is sent to all top-level windows. In this manner, an application 29 can adjust itself to the new state of the SIP window 50, such as by adjusting its size in response to this message. To this end, a flag, SPI_SETSIPINFO, is sent with this message to indicate when SIP information has changed, and another flag, SPI_SETCURRENTIM, when the current Input Method has changed. The flag is tested to determine if the message is SIP-related or another type of setting change message. If SIP-related, for performance reasons, the applications that are not currently active in the foreground cache these SIP changes. If the application's window is active, the application can adjust its size and/or window. For example, as shown in FIGS. 5 and 9, when the SIP window is hidden and an active application 29 notified, the application 29 may use the additional desktop space 68 to display more information. Note that an application 29 that has cached a SIP change when inactive can query the current SIP state when activated to subsequently adjust itself in an appropriate manner in accordance with the information that is returned.

To query the SIP manager 58, another function, SHSipInfo, is provided so that applications 29 can determine information about the SIP window 50 and Input Method 64. In general, if this function succeeds, the return value will be nonzero, while if this function fails, the return value will equal zero and extended error information will be available via a GetLastError( ) call.

The following table sets forth the structure of this call:

```
SHSipInfo(
    UINT uiAction
    UINT uiParam
    PVOID pvParam
    UINT fwinIni
);
```

The uiAction parameter can include the values SPI_SETSIPINFO, SPI_GETSIPINFO, SPI_SETCURRENTIM and SPI_GETCURRENTIM. SPI_SETSIPINFO indicates that pvparam points to a SIPINFO structure (described above). The cbSize, dwImDataSize and pvImDataSize are filled in before calling the SHSipInfo function. In response to this call, the SIPINFO structure is filled in with the current SIP size, state, and visible desktop rectangle. If both dWImDataSize and pvImData are nonzero, the data size and pointer are sent to the Input Method 64. If the Input Method 64 is called but does not provide Input Method-specific data, or the format or size of the data passed in is not in a format recognized by the Input Method 64, then the SHSipInfo function call fails (returns zero). If the size and format are supported by the Input Method 64, the Input Method 64 fills in the buffer that is pointed to by pvImData with the Input Method-specific data. Typically, an application 29 will set the pvImDataSize to zero and pvImData to NULL.

A uiAction of SPI_SETSIPINFO indicates that pvParam points to a SIPINFO structure. The SIP window 50 size and state are set to the values specified in the SIPINFO structure. Before changing a SIP value, the application 29 should first obtain the current SIP state by calling SHSipInfo with SPI_GETSIPINFO, then change whatever specific SIP state values it wishes to change before making the SPI_SETSIPINFO call. The cbSize field is set to the size of the SIP in the structure, and if both pvImDataSize and pvImData are not zero, the data size and pointer are sent to the Input Method 64. The SHSipInfo call fails if the Input Method 64 is called and does not allow setting Input Method-specific data, or if the format or size of the passed data is not in a format recognized thereby. If a size and format are supported by the Input Method 64, the Input Method 64 uses the data to set Input Method-specific information. Typically, an application will set the pvImDataSize to zero and pvImData to NULL.

SPI_SETCURRENTIM indicates that pvParam points to a CLSID structure which specifies the CLSID of the Input Method 64 to which the SIP will switch. If the CLSID is not valid, or if the specified Input Method 64 cannot be loaded, the call fails (return value equals zero) and a default Input Method 64 (e.g., the QWERTY-like keyboard 66) is loaded.

Lastly, a uiAction of SPI_GETCURRENTIM indicates that pvParam points to a CLSID structure that receives the CLSID of the currently selected Input Method 64.

The IInputMethod Interface

IInputMethod is the interface implemented by the Input Method 64 components. The SIP manager 58 calls the methods of this interface to notify the Input Method 64 of state changes, and request action and information from the Input Method 64. In general, if the called method succeeds, a success is returned, and conversely, if the method fails, a failure result is returned. The following table sets forth the method calls available in this IInputMethod interface:

```
Interface IinputMethod : Iunknown
{
    HRESULT Select( [in] HWND hwndSip );
    HRESULT Deselect( void );
    HRESULT Showing ( void );
    HRESULT Hiding ( void );
    HRESULT GetInfo ( [out] IMINFO *pimi );
    HRESULT ReceiveSipInfo ( [in] SIPINFO *psi );
    HRESULT RegisterCallback ( [in] IIMCallback* pIMCallback );
    HRESULT GetImData ( [in] DWORD dwSize, [out] LPVOID pvImData );
    HRESULT SetImData ( [in] DWORD dwSize, [in] LPVOID pvImData );
    HRESULT UserOptionsDlg ( [in] HWND hwndParent );
}
```

An Input Method 64 will ordinarily receive a Select( ), GetInfo( ), ReceiveSipInfo( ) and Register Callback( ) method call, in sequence, before rendering the SIP window 50 space or responding to user actions. When the SIP window 50 is displayed (i.e., turned on), Showing( ) will be called by the SIP manager 58, after which the Input Method 64 issues a WM_PAINT message to render the SIP window 50.

The Select( ) method is called when the Input Method 64 has been selected into the SIP. The Input Method 64 generally performs any desired initialization in response to this call. The Input Method is responsible for drawing the entire client area of the SIP window 50, and thus ordinarily creates its windows and imagelists (collections of displayable bitmaps such as customized icons) in response to this call. For example, the window handle of the SIP window 50 is provided to the Input Method 64 as a parameter accompanying this Select( ) method call, and the Input Method normally creates a child window of this SIP window 50. The Input Method 64 is also provided with a pointer to a value, which is set to nonzero by the Input Method 64 if the method call is successful or zero if not successful.

The Deselect( ) method is called when the Input Method 64 has been selected out of the SIP. The Input Method's window should be destroyed in response to this call, and the Input Method 64 will typically perform any other cleanup at this time.

The Showing( ) method will cause the SIP window 50 to be shown upon return from the call. Note that the SIP window 50 is not visible prior to this call, and that once the SIP window 50 is shown, this window and its children will receive paint messages. Conversely, the Hiding( ) method hides the SIP window 50 upon return from the call. Accordingly, the Showing( ) and Hiding( ) methods are used to toggle the SIP window 50 between its open and closed states.

The GetInfo( ) method is called when the system is requesting information about the Input Method 64. The information requested includes flags indicating any special properties of the Input Method 64, the handles of two imagelists which contain masked bitmaps that are to be displayed on the SIP button 52 when that Input Method 64 is active, indices into the specified imagelists, and a rectangle indicating the preferred size and placement of the Input Method 64. The call includes a parameter, pimi, which is a pointer to a data structure (IMINFO) that the Input Method 64 should fill in with appropriate data. The call also provides a pointer to a value that the Input Method should set to nonzero to indicate success and zero to indicate failure. More particularly, the IMINFO data structure is represented in the following table:

```
Typedef struct {
    DWORD cbsize;
    HIMAGELIST hImageNarrow;
    HIMAGELIST hImageWide;
    Int iNarrow;
    Int iWide;
    DWORD fdwFlags;
    Rect rcSipRect;
} IMINFO;
```

The cbSize field contains the size of the IMINFO structure, and is filled in by the SIP manager 58 prior to calling GetInfo( ). The hImageNarrow field is a handle to an imagelist containing narrow (e.g., 16×16) masked bitmaps for the Input Method 64. Similarly, hImageWide is a handle to the imagelist containing wide (e.g., 32×16) masked bitmaps. The SIP manager 58 displays one of the bitmaps (e.g., on the taskbar 56) to indicate the Input Method 64 that is currently selected. Note that the SIP manager 58 may use the narrow or wide bitmaps at various times depending on how it wishes to display the bitmap.

The iNarrow field is an index into the hImageNarrow imagelist indicating which bitmap of several possible from that (narrow) imagelist should currently be displayed. Similarly, the iWide field is an index into the hImageWide imagelist indicating which bitmap from that (wide) image list should currently be displayed. Note that the Input Method 64 can initiate a change of the bitmap displayed in the SIP taskbar button 52 by calling IIMCallback::SetImages (described below).

The fdwFlags field indicates the visible, docked and locked states (SIPF_ON SIPF_DOCKED and SIPF_LOCKED) of the Input Method 64, as well as any special Input Method flags that may be defined in the future. Note that the SIP state flags are ignored for the GetInfo( ) method, but are used in the SetImInfo callback method as described below.

Lastly, the rcSipRect field describes the size and placement of the SIP rectangle. The sizing and placement information returned from GetInfo( ) may be used by the SIP when determining an initial default size and placement. When used, the SetImInfo callback method (described below) specifies the new size and placement of the SIP window 50.

The ReceiveSipInfo( ) method provides information to the Input Method 64 about the SIP window, including the current size, placement and docked status thereof. This call is made whenever the user, an application 29 or the Input Method 64 changes the SIP state. When the SIP manager 58 sends this information during Input Method initialization, the SIP manger 58 is informing the Input Method 64 of the default SIP settings. The Input Method 64 can choose to ignore these defaults, however the values given are ones that either the user has selected or values that have been recommended as expected or accepted SIP values for that platform. A pointer to the SIPINFO structure that includes this information is passed with this call.

The RegisterCallback method is provided by the SIP manager 58 to pass a callback interface pointer to the Input Method 64. In other words, the RegisterCallback method call passes an IIMCallback interface pointer as a parameter to the Input Method 64, whereby the Input Method 64 can call methods on this interface to send information back to the SIP manager 58 as described below. The Input Method 64 uses the callback interface pointer to send keystrokes to applications 29 via the SIP manager 58 and to change its SIP taskbar button bitmap 52.

The GetImData( ) method is called when an application program 29 has asked the SIP for the SIPINFOdata structure and has provided a non-NULL pointer for the pvImData member of the SIPINFO structure. The application 29 will ordinarily cause this call to be made when requesting some special information from the Input Method 64. Two parameters are passed with this call, dwsize, the size of the buffer pointed to by pvImData, and pvImData, a void pointer to a block of data in the application 29.

With this call, the application 29 is essentially requesting that the Input Method 64 fill the block with information, wherein the size and format of the data are defined by the Input Method 64. This call is designed for Input Methods 64 that wish to provide enhanced functionality or information to applications. By way of example, a SIP-aware application may wish to know whether a character was entered by way of the SIP or by some other means. An input method 64 can thus respond to the application's request by filling the block.

The SetImData( ) method is called when an application 29 has set the SIPINFO data structure and has provided a non-NULL pointer for the pvImData member of the SIP-INFO structure. The application 29 will ordinarily cause this call to be made when requesting that the Input Method 64 set some data therein. The parameters passed with this call include dwsize, the size of the buffer pointed to by pvImData, and pvImData, a void pointer to a block of data in the application 64.

The IIMCallback Interface

The Input Method 64 uses the IIMCallback interface to call methods in the SIP manager 58, primarily to send keystrokes to the current application or to change the icon that the taskbar 56 is displaying in the SIP button 52. The Input Method 64 ordinarily calls the IIMCallback methods only in response to a call thereto which was received through an IInputMethod method call. In general, if the function succeeds, the return value will be a success HRESULT, while conversely, if the function fails, the return value is a failure HRESULT.

The following table represents the IIMCallback Interface:

```
Interface IIMCallback :
Iunknown
{
    Hresult SetImInfo (
            IMINFO *pimi );
    Hresult SendVirtualKey (
            BYTE bVk,
            DWORD dwFlags );
    Hresult SendCharEvents (
            UINT uVk,
            UINT uKeyFlags,
            UINT uChars,
            UINT *puShift,
            UINT *puChars );
    Hresult SendString (
            BSTR ptrzStr,
            DWORD dwChars );
}
```

The first callback, SetImInfo( ) is called by the Input Method 64 to change the bitmaps shown on the SIP taskbar button 52 representing the current SIP, or to change the visible/hidden state of the SIP window 50. It is also sent by the Input Method 64 to the SIP manager 58 as a notification when the Input Method 64 has changed the size, placement or docked status of the SIP window 50. By this mechanism, the various Input Methods 64 are able to alert the SIP manager 58 to these types of changes so that the two remain synchronized. By way of example, an Input Method 64 may wish to have a user interface element which allows the user to toggle between a docked state and a floating state, or between one or more subpanels (e.g. keyboard with buttons to switch to a number and/or symbol panel or international symbol panel). The Input Method 64 uses this call to inform the SIP manager 58 of each change in state.

Values passed in the IMINFO structure are used by the SIP manager 58. Consequently, the Input Method 64 should first determine the current state of the SIP window 50 as provided by the SIP manager 58 in the SIPINFO structure received via a prior ReceiveSipInfo( ) method call, described above. Then, the Input Method 64 should make changes to only those settings in which a change is desired, and pass a full set of values back in the IMINFO structure. The pimi parameter is sent as a pointer to an IMINFO structure representing the new Input Method 64 settings, including the size, placement and state of the SIP window 50 as well as the desired Input Method 64 images.

In response to the SetImInfo( ) call, the SIP manager 58 will show or hide the SIP window 50 as specified in the fdwFlags of the IMINFO structure. However, the SIP manager 58 will not resize or move the SIP window 50 if requested, but will instead update the size and placement information returned to applications 29 when queried. If the specified values represent a change from the current SIP state, the SIP manager 58 will notify applications 29 that the SIP state has changed via a WM_SETTINGCHANGE message, described above.

The SendVirtualKey( ) callback is used by an Input Method 64 to simulate a keystroke for a virtual key, e.g., a character or the like entered via the touch screen display 32 or some other Input Method 64. The key event will be sent to the window which currently has focus (i.e., the window which would have received keyboard input had a key been pressed on an external keyboard). The SendVirtualKey callback modifies the global key state for the virtual key sent, whereby, for example, an Input Method 64 can use this function to send SHIFT, CONTROL, and ALT key-up and key-down events, which will be retrieved correctly when the application 29 calls the GetKeyState( ) API. The SendVirtualKey callback should be used to send virtual key events that do not have associated characters (i.e., keys that do not cause a WM_CHAR sent as a result of TranslateMessage. Note that WM_CHAR, TranslateMessage and other key-related messages are described in the reference "Programming Windows 95", Charles Petzold, supra). If character-producing virtual keys are sent via this function, they will be modified by the global key state. For example, a virtual key of VK_5 that is sent when the shift state is down will result in a '%' WM_CHAR message for certain keyboard layouts.

Parameters sent with this callback include bVk, which is the virtual keycode of the key to simulate, and dwFlags. The dwFlags may be a combination of a SIPKEY_KEYUP flag, (used to generate either a WM_KEYUP or WM_KEYDOWN), a SIPKEY_SILENT flag, (the key press will not make a keyboard click even if clicks are enabled on the device), or zero.

The SendCharEvent callback allows an Input Method 64 to send Unicode characters to the window having focus, while also determining what WM_KEYDOWN and WM_KEYUP messages the application 29 should receive. This allows the Input Method 64 to determine its own keyboard layout, as it can associate any virtual key with any characters and key state. Applications 29 thus see keys as if they were sent from a keyboard (i.e., they get WM_KEYDOWN, WM_CHAR, and WM_KEYUP messages). Thus, unlike the SendVirtualKey( ) function, this function does not affect the global key state. By way of example, with the SendCharEvent callback, the Input Method 64 can determine that the shifted (virtual key) VK_C actually sent the Unicode character 0x5564. The shift state flag (specified in the puShift parameter, described below) that is associated with the first character to be sent determines whether a WM_KEYDOWN or WM_KEYUP is generated.

Parameters include uVk, the virtual keycode sent in the WM_KEYUP or WM_KEYDOWN message generated as a result of this function, and a uKeyFlags parameter, a set of KEY state flags that are translated into the lKEYData parameter received in the WM_CHAR, WM_KEYUP or WM_KEYDOWN messages received by the application 29 as a result of this call. Only the KeyStateDownFlag, KeyStatePrevDownFlag, and KeyStateAnyAltFlag key state flags are translated into the resulting lKeyData parameter. The uChars parameter represents the number of characters corresponding to this key event, while the puShift parameter is a pointer to a buffer containing the corresponding KEY_STATE_FLAGS for each character to be sent. If the KeyStateDownFlag bit is sent, this function generates a WM_KEYDOWN message, otherwise it generates a WM_KEYUP message. Lastly, the puChars parameter is a pointer to a buffer containing the characters to be sent.

An Input Method 64 may use the SendString callback to send an entire string to the window which currently has the focus, whereby a series of WM_CHAR messages are posted to the application 29. An Input Method 64 would typically use this callback after it has determined an entire character, word or sentence has been entered. For example, a handwriting recognizer or speech recognizer Input Method 64 will use the SendString callback after it has determined that a full word or sentence has been entered.

Parameters of the SendString callback include ptszStr, a pointer to a string buffer containing the string to send, and dwSize, the number of characters to send. This number does not include the null-terminator, which will not be sent.

Writing and Text Entry Modes

In accordance with one aspect of the present invention, the selected or deselected state of the SIP window 50 is used as a basis for determining the mode for inputting user data. In general, when a SIP 50 is selected and displayed to the user, the system/application program 29 is in a text entry mode, while when deselected and not displayed, the system/application program 29 is in a writing mode. In the text entry mode, the selected input method 64 receives the user data, such as pen events or speech, and the appropriate input method 64 converts the events to text, preferably encoded as Unicode characters. The input method 64 passes the text to the application program 29 as described above (via the SendVirtualKey callback). In the writing mode, the user input is passed to the application program 29 as is, for example, as coordinate-based pen events.

As shown in FIG. 5, the user may have used the text entry mode to enter text 74, and the pen mode to enter digital ink 76 such a sketch or the like, in the same application program 29. The entered text 74 and digital ink 76 appear in a window 78 of the application program 29. In FIG. 5, wherein the pen mode is currently enabled, (text entry mode disabled), the user is made aware of the pen mode by visual feedback, including the application window 78 occupying virtually the entire device screen area for entering data therein, i.e., the absence of any SIP window. In addition, in one current preferred implementation, in the pen mode, horizontal lines $80_1$–$80_6$ are displayed across the application window 78, generally giving the user input area the appearance of lines on paper.

FIG. 6 shows the text entry mode enabled wherein an input method 64 in the form of a keyboard 66 has been selected via the SIP selection button 52. For purposes of the following examples, an alphanumeric keyboard 66 and associated input method 64 will be used to illustrate the SIP-selected state for describing the text entry mode, although it is understood that another SIP/input method may be selected, such as one directed to character recognition or speech recognition. Thus, in FIG. 6, wherein the text entry mode is currently enabled (pen mode disabled), the user is made aware of the text entry mode by visual feedback, including the SIP window 50 with the bitmap image of the keyboard 66 therein. In addition, the application window 78 has been resized as described above. Moreover, in one current implementation, in the text entry mode, the horizontal lines have been removed, generally giving the user input area the appearance of a word processing application program's input area.

In keeping with the invention, while in the text entry mode, a "Select" mode is automatically selected for the user. A select button 82 may be used to provide visual feedback to the user indicative of the select mode being enabled, e.g., the button may appear to the user as having been depressed. In general, user activity in the SIP window 50, presently the keyboard 66, results in text being sent to the application. Alternatively, user activity in the application window 78 results in pen events being sent to the application program 29, such as to enable text-editing operations, whereby the application program 29 appropriately interprets the events. For example, a single-tap of the pen in the application program 29 area sets a caret 84 based on the location of the tap, as shown in FIG. 6. In addition, a double-tap is interpreted as selecting a word, a triple-tap as selecting a line (or alternatively a sentence or paragraph), while another area of text may be selected by dragging the pen over it. Such editing operations are similar to those performed by conventional word processing programs.

Figure 8:
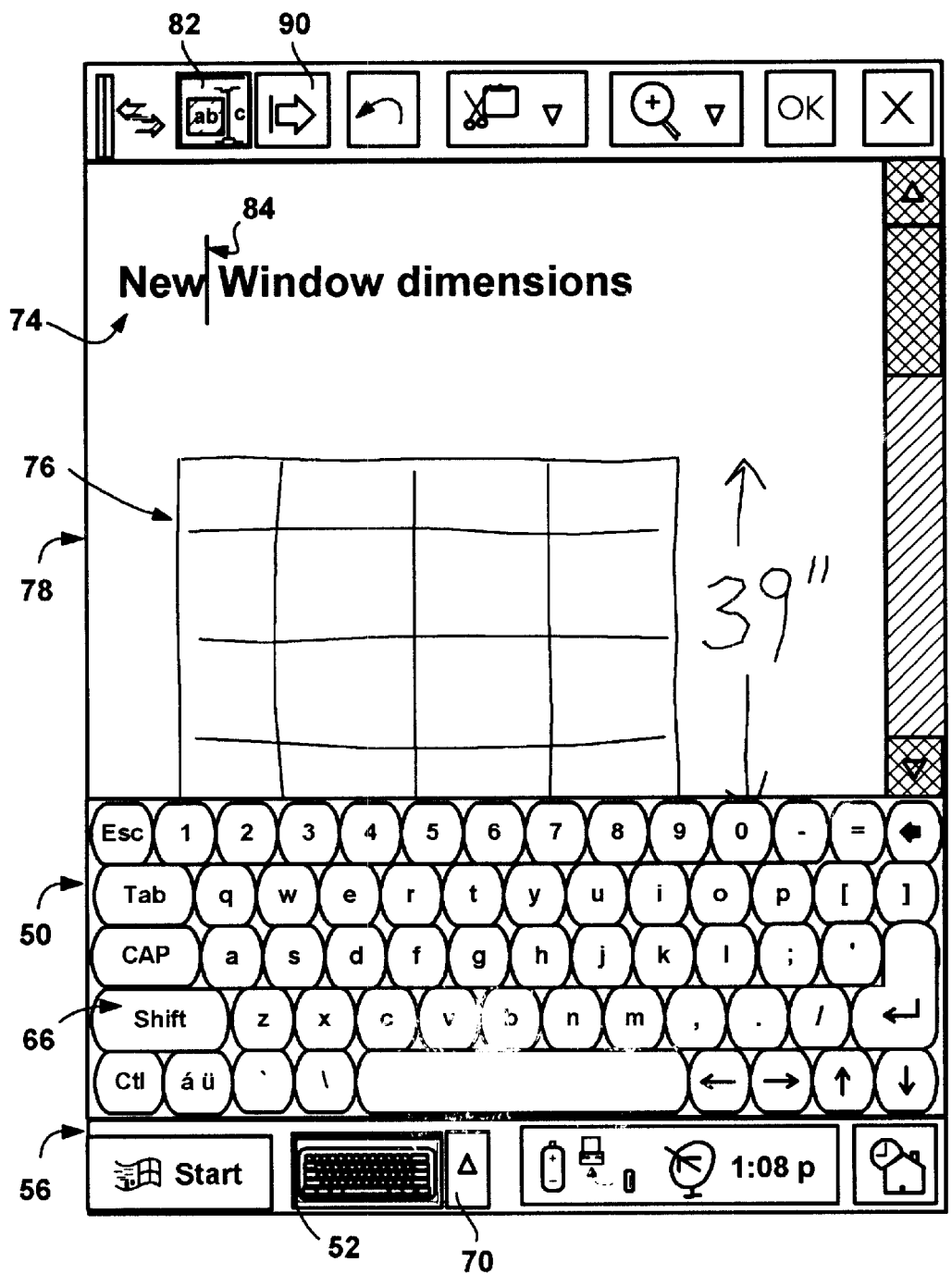

FIG. 7 shows a selection box 86 marking the selected text (word) by either the user double-tap or dragging operation. FIG. 8 shows the insertion of text, (after the deletion of the selected text in the box 86), by moving the caret 84 in front of the word "Window" and tapping keys on the keyboard 66 to enter the text "N" "e" and "w" (the caret 84 appropriately follows the entry to indicate the next insertion position). Thus, as shown in FIGS. 6–8, text may be input and edited in an intuitive manner.

FIG. 9 shows the user having deselected the SIP and thereby the text entry mode, and having re-entered the pen (writing) mode to enter new digital ink and/or edit the ink in the application window 78. Note that the lines $80_1$–$80_6$ have been redisplayed, and the select mode, indicated by the button 82, is not presently enabled. At this time, any pen events entered by the user in the application window 78 are passed to the application program 29 as digital ink strokes, enabling writing operations. Such writing is visibly reflected on the screen as electronic ink.

Figure 10:
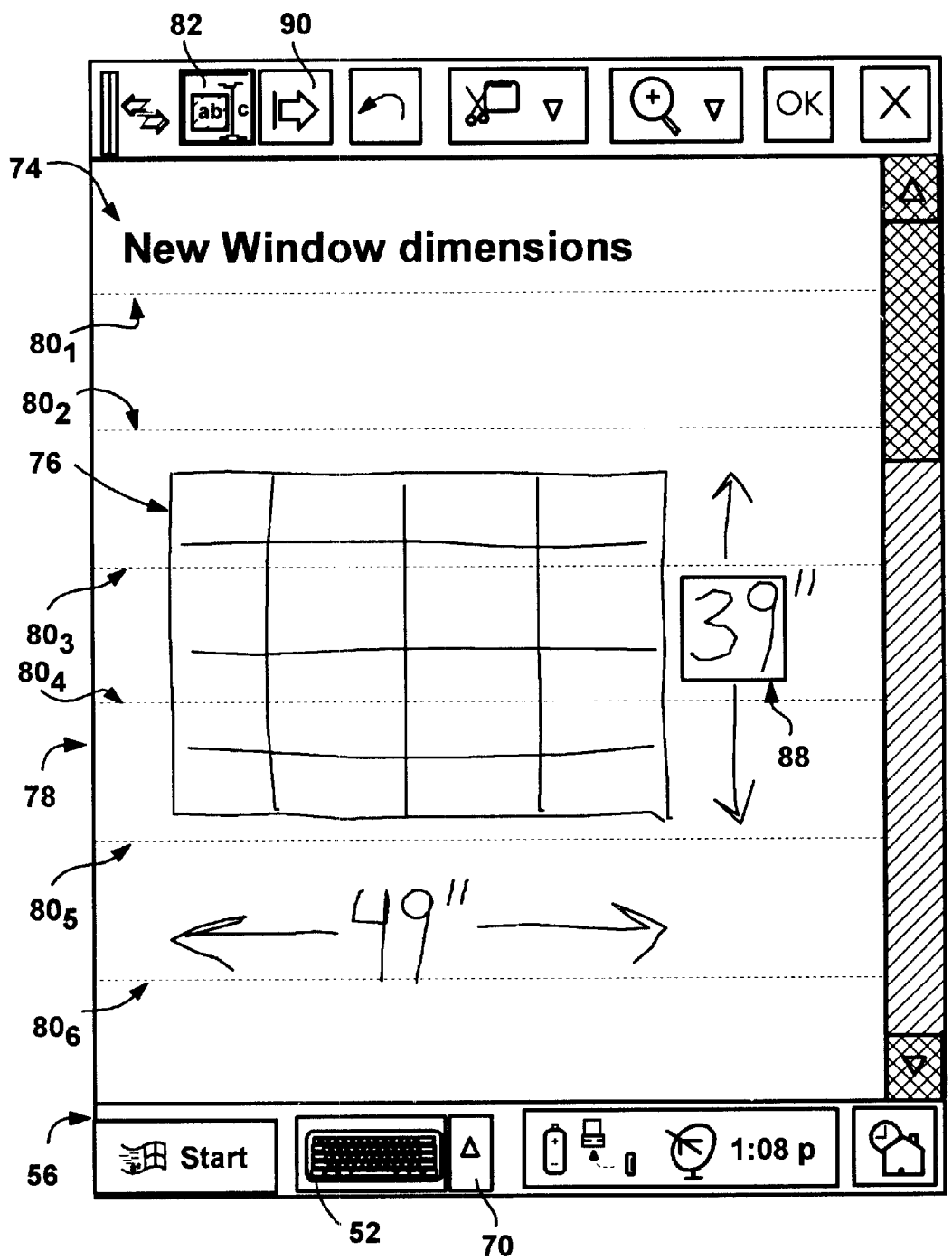
FIGS. 10–16 represent a display on a touch-sensitive display screen showing various exemplary writing (inking) and ink editing operations while in the writing/pen mode.
Figure 11:
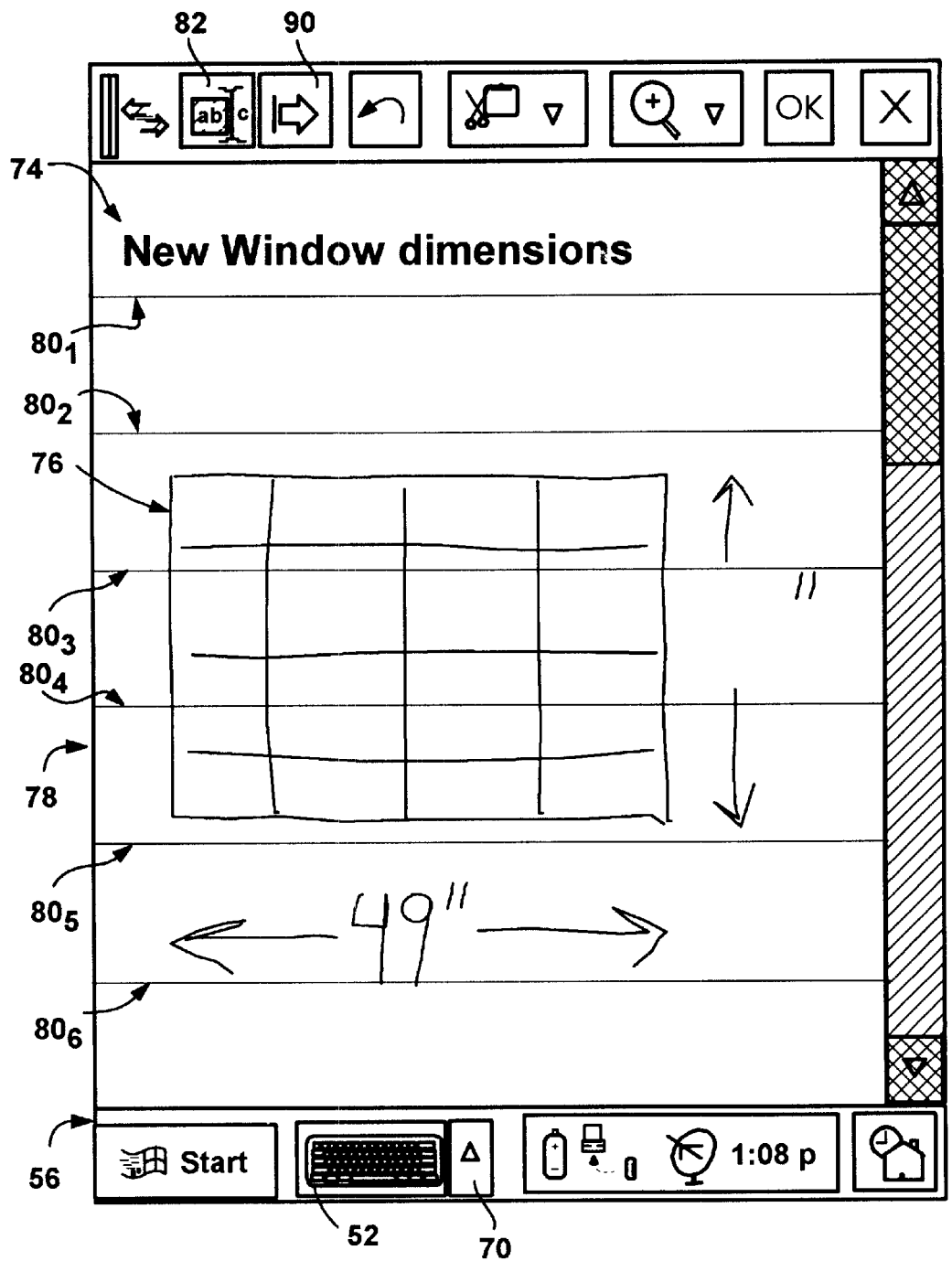
Figure 12:
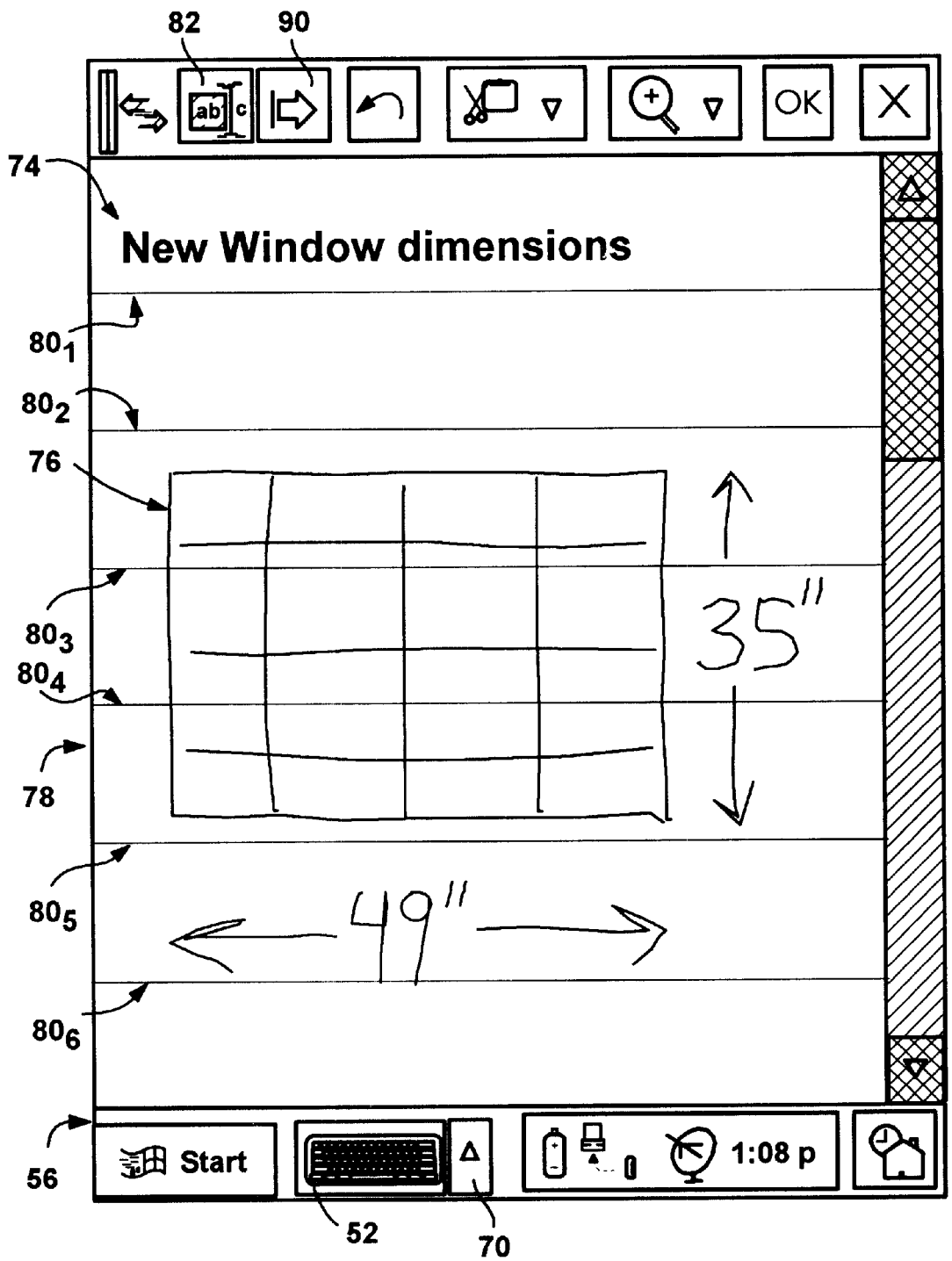

There is also a select sub-mode that can be entered while within the pen/writing mode, as shown in FIG. 10. The pen-select sub-mode is chosen by the user via a tap of the displayed select button 82. Note the horizontal lines $80_1$–$80_6$ may appear as dashed, as shown in FIG. 10, to provide additional visual feedback to the user indicative of the current pen-select mode. When in this pen-select mode, the user is able to use the pen to draw a box 88 around selected digital ink in an area of the application window 78, which may then be cut, copied, pasted, deleted, or resized, depending on subsequent user actions, (or alternatively, the user may exit the select mode without taking any action on the selected ink). For example, as shown in FIG. 11, deleting the ink in the selection box 88 clears the area bounded thereby of any digital ink. In a current preferred implementation, the pen select mode is a one-shot operation, e.g., the system returns to the regular pen mode to enable the entry of digital ink after any action (e.g., a delete or resize operation) is performed on the selected ink. Note that the horizontal lines $80_1$–$80_6$ are once again displayed as solid lines at this time, and the button 82 no longer appears depressed. The user may then enter new ink, as shown in FIG. 12, where the ink resembling "35" has been written to the approximate area where the select and delete operations took place.

Figure 13:
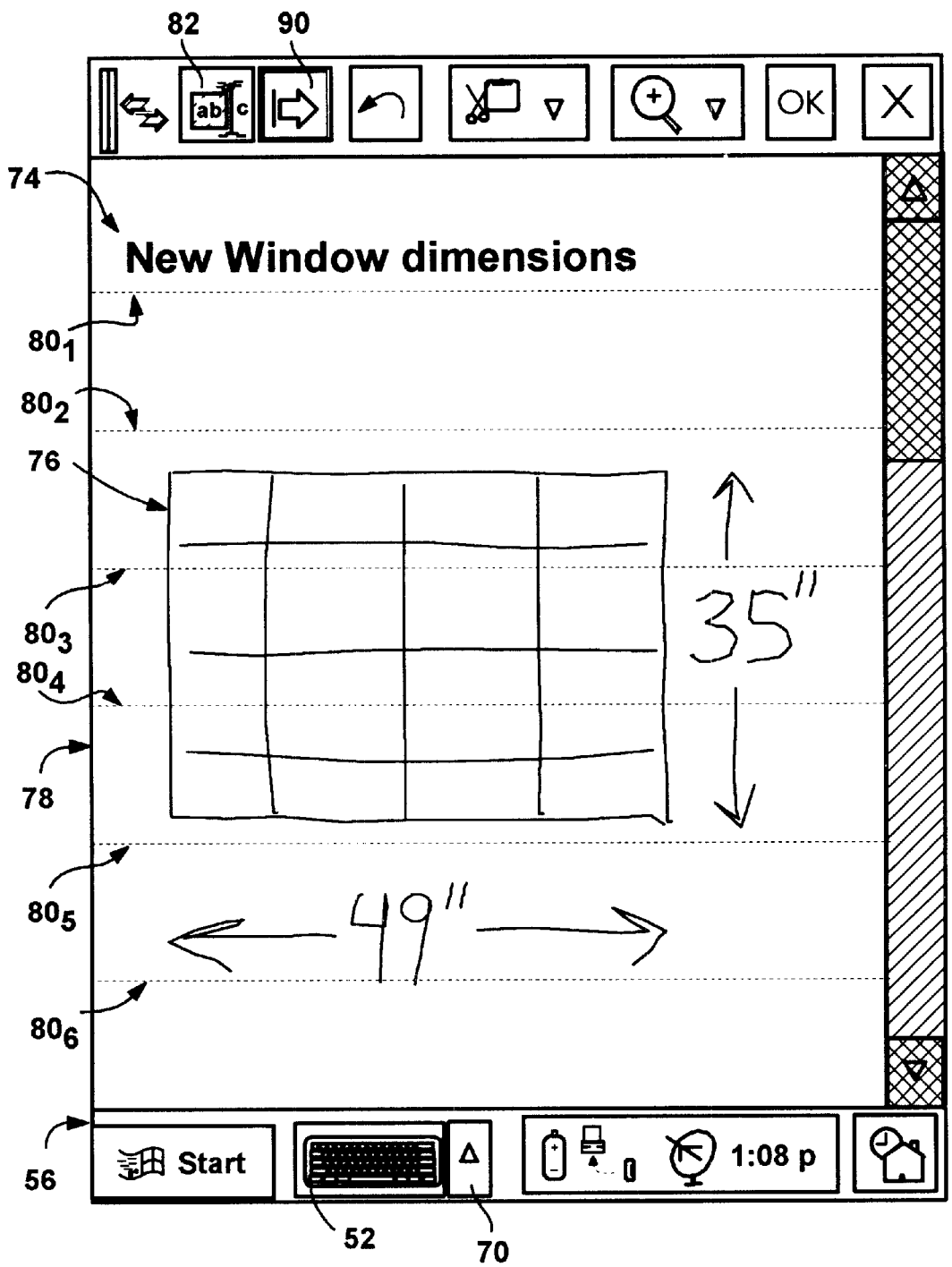
Figure 14:
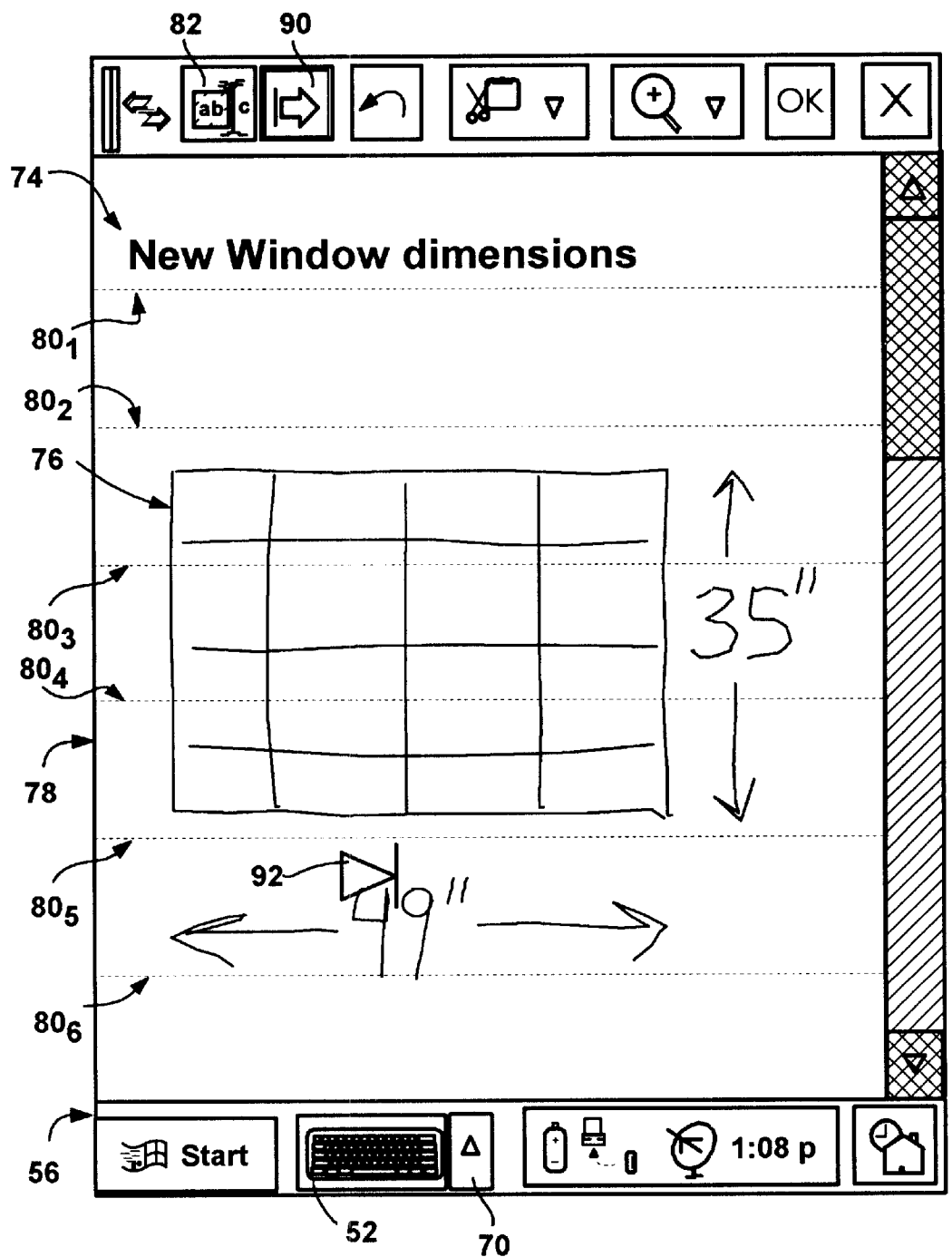

Another sub-mode of the pen mode is referred to as an insert space mode, or simply the space mode. The user enters the space mode by tapping a space insert button 90 (FIG. 13), which may appear as depressed to indicate the space mode. Note that the horizontal lines $80_1$–$80_6$ again appear as dashed in the present implementation, as shown in FIG. 13, to provide additional visual feedback to the user indicative of the currently active space mode. At this time, the user may use the pen to select a position for inserting space, by touching the pen to the application window 78 and dragging the pen a distance corresponding to the space to insert. FIG. 14 shows the pen having been dragged an amount to the right as indicated by the size of an arrow 92 which temporarily appears during the dragging operation to assist the user.

Figure 15:
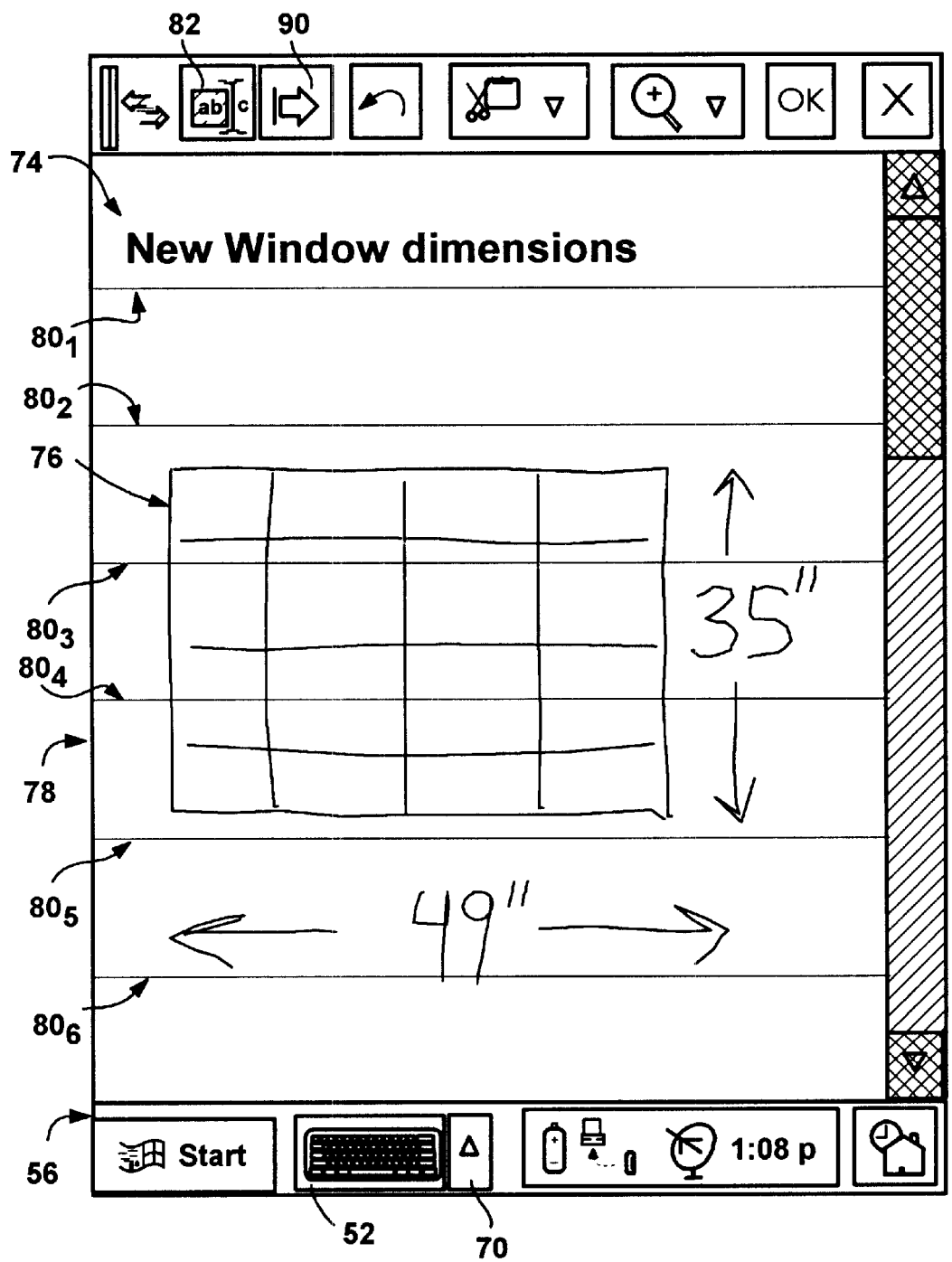
Figure 16:
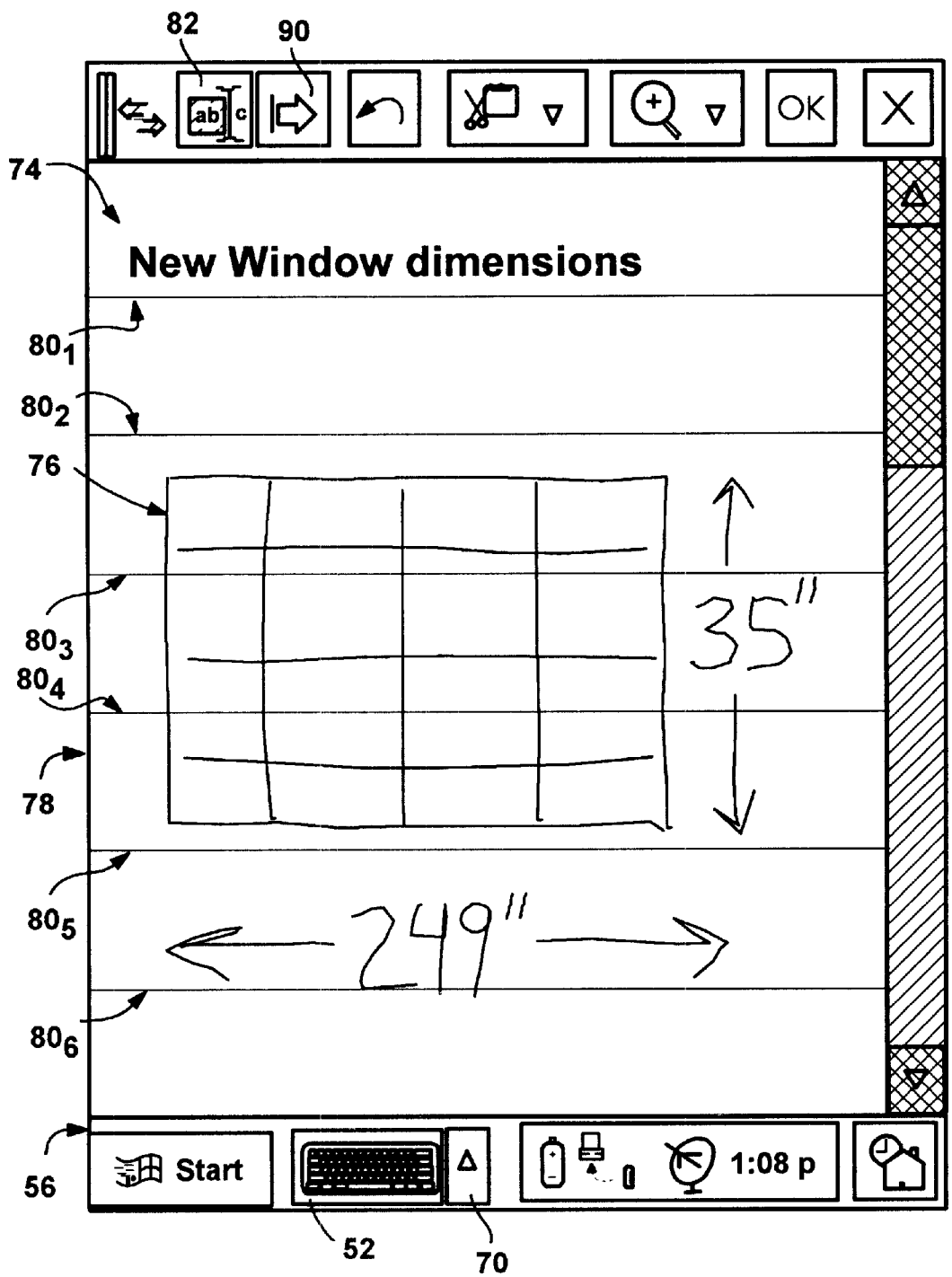

When the pen is lifted, a space is added that corresponds to the size of the arrow, the space mode is exited, (also lines $80_1$–$80_6$ return to solid and the insert space button 90 is restored), whereby the system returns to the regular pen mode as shown in FIG. 15. At this time, the user may reenter one of the other pen sub-modes, or add additional digital ink as shown in FIG. 16, wherein the ink generally resembling a "2" has been written to the area where the space was inserted via the space mode.

In accordance with one aspect of the present invention, any time that the user wishes to switch to the text entry mode while in the pen mode (including any pen sub-modes), the user simply selects a SIP via the SIP button 52 on the task bar 56, (or the button 70, which provides a pop-up window of available IMs). Conversely, while in the text entry mode, any time that the user wishes to switch to the pen mode, the user simply deselects the SIP via the SIP button 52. The SIP architecture and the application handle the resizing of the windows, the switching of the modes and the initial state of the sub-modes, and so on, whereby the user is relieved from much of the confusing manual operation.

Figure 17:
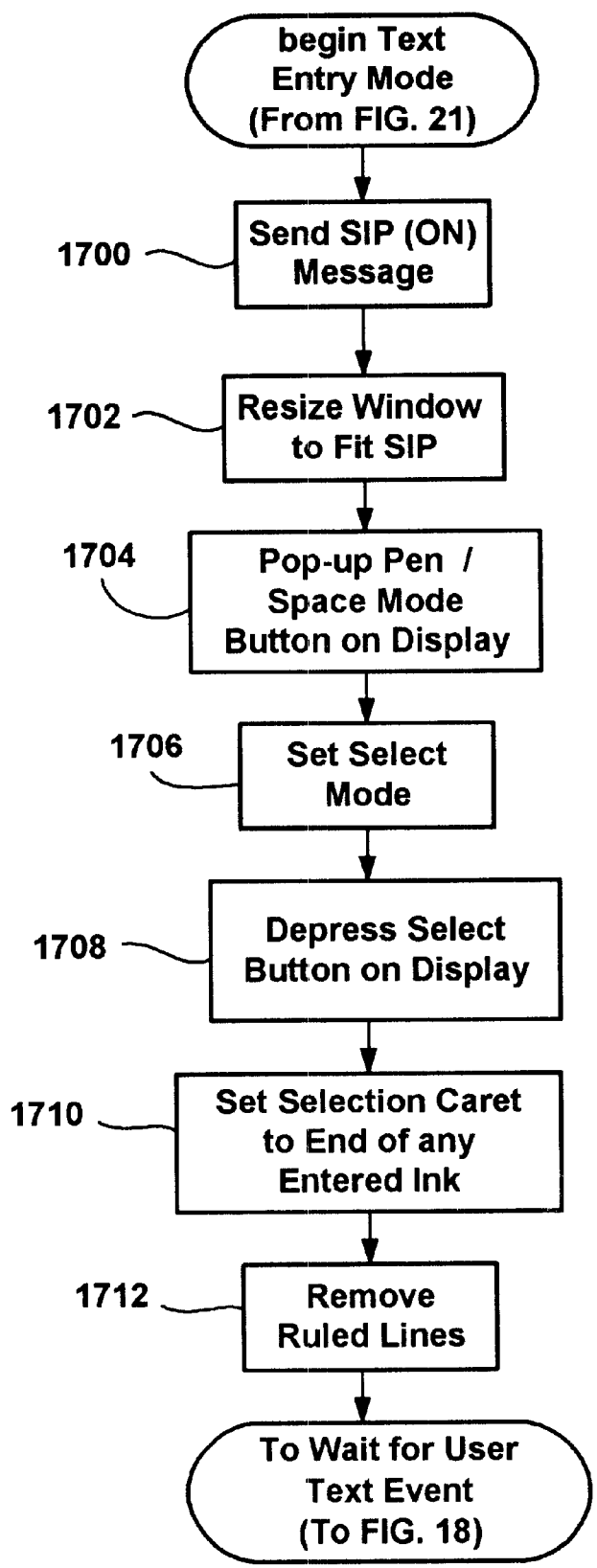
FIG. 17 is a flow diagram representing general steps taken to switch to the text entry mode in accordance with an aspect of the present invention.
Figure 18:
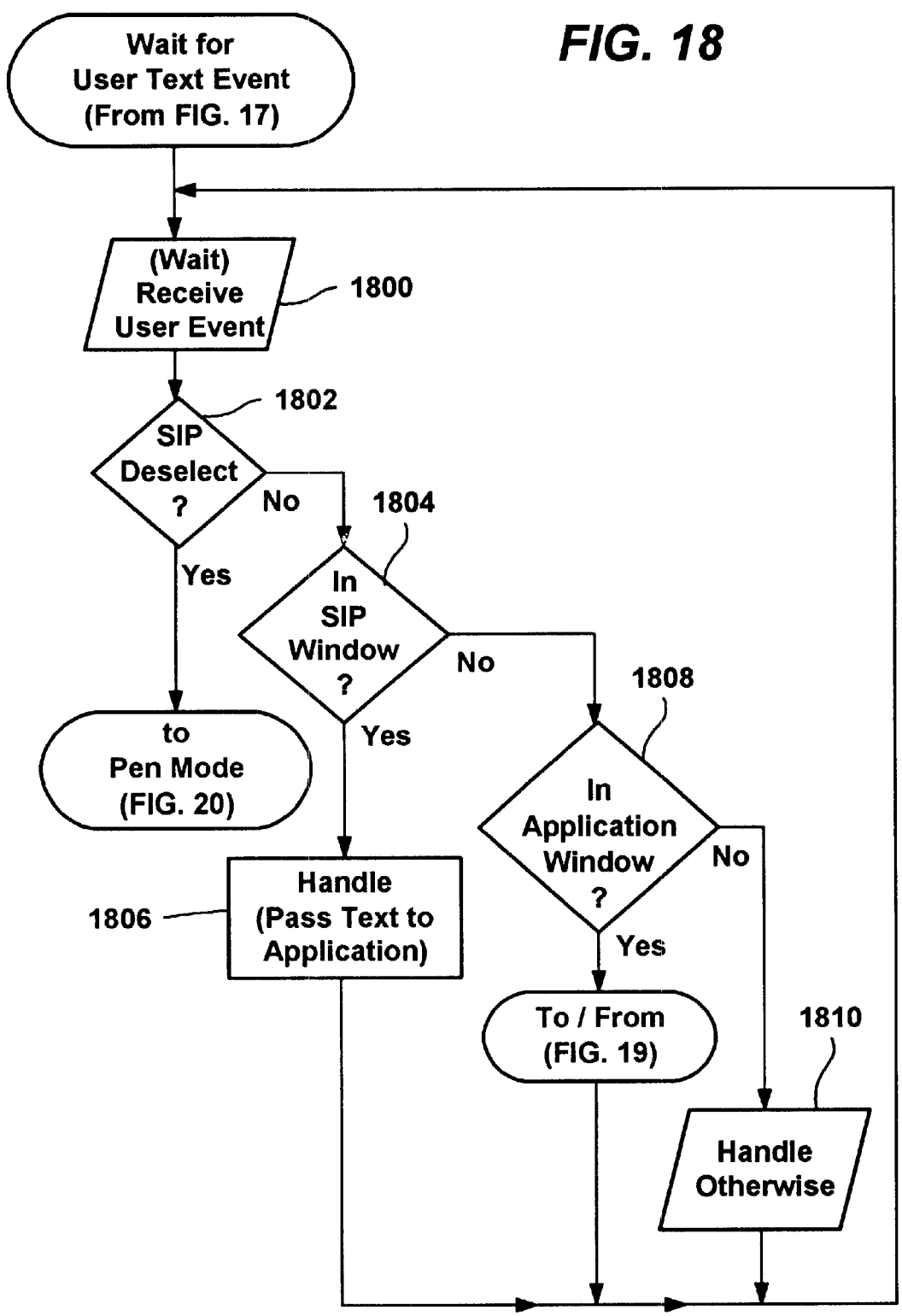
FIG. 18 is a flow diagram representing the detection and handling of pen events while in the text entry mode in accordance with an aspect of the present invention.

Turning to an explanation of the operation of the present invention, FIGS. 17–21 generally show how the modes are automatically switched as the user selects or deselects the SIP. In FIG. 17, the user begins in the text entry mode, either by a startup default or by having selected a SIP 50 as described above. For purposes of the following description, the selected SIP will be the keyboard 66. At step 1700, a SIP "On" message is sent whereby among other actions as described above, the system will activate the SIP window 50 and the input method will draw the keyboard 66 therein. When the application program 29 receives the message, the application program 29 resizes the application window 78 (step 1702), and then, if needed, at step 1704, restores the pen insert space mode button 90 to its popped-up position. At step 1706, the text select mode will automatically be entered for the user as described above, and the select button 82 on the display depressed to indicate the availability of the select mode. At step 1710 the caret 84 will be moved by the application program 29 to an appropriate screen location, e.g., at the end of any entered text, and the horizontal lines removed at step 1712. At this time, the system and application program 29 are ready for text entry or user editing via the select mode, and awaits further user activity, as shown in FIG. 18.

At step 1800, a user event is received and action taken based thereon. It should be noted that in the present implementation, the system is event-driven. However, for purposes of simplified illustration, FIG. 18 (and similarly FIGS. 19 and 21), show the general logic for handling the user event through a series of decisions. As represented in FIG. 18 by step 1802, if the SIP has been deselected (via the button 52), the system changes to the pen mode, as described above and as represented in FIG. 20, described below. If not, steps 1804–1806 represent the action taken if the user has tapped an area in the keyboard 66, that is, typically the input method 64 converts the pen event coordinates to a corresponding key value, which is then passed as a character (e.g., Unicode) to the application. Note that in handling the user action, the input method 64 may delay or not actually send anything to the application program 29 at this time. For example, if the "CAP" key is pressed, the state of the keyboard would change to capital letters without the application program 29 ordinarily being notified. Similarly, if the input method was one that handled speech recognition, the input method would wait until one or more words were recognized or some-time-out occurred, and then send a string of characters representing those words as text to the application. In any event, after performing an action in response to the user activity in the SIP window 50 (or in the case of speech, directed thereto), step 1806 loops back to await further user input.

If the pen activity was also not in the SIP window 50 (keyboard 66), step 1808 represents the detection of user activity in the application window 78, which is interpreted by the application program 29 as text-select mode activity, described below with reference to FIG. 19. If not in the application window 78, the user activity is otherwise handled, for example to close the application program 29 if the "X" box in the upper right corner is tapped and so on, events which are not particularly relevant to the present invention and is not described herein.

Figure 19:
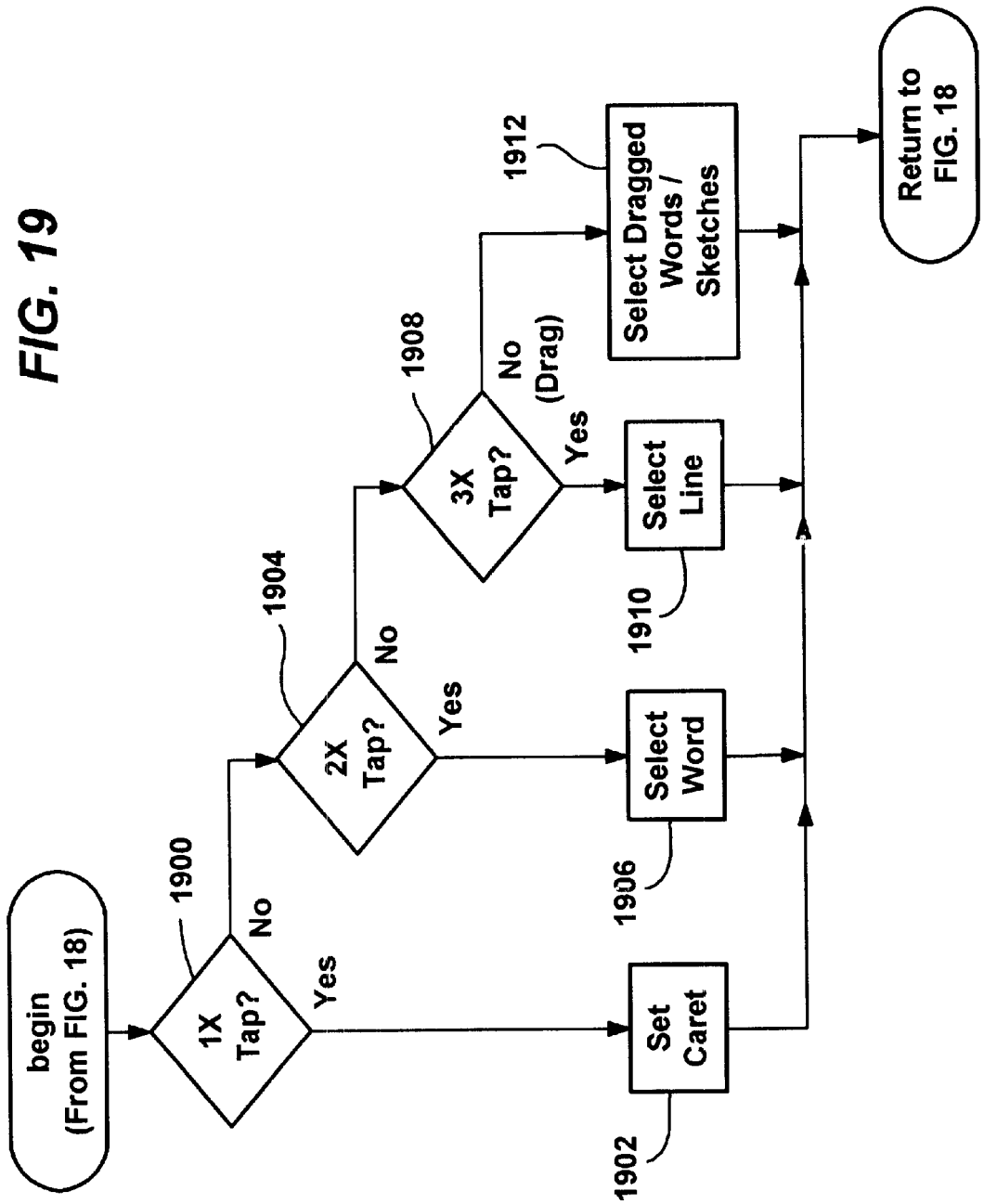
FIG. 19 is a flow diagram representing the handling of pen events detected in the application window to select and edit while in the text entry mode.

FIG. 19 represents the detection and handling of the various pen events in the application window 78 while in the text select mode. Note that the application program 29 handles these events by receiving coordinate-based pen events over time from the operating system, and not via the input method 64. Although not necessary to the invention, a general description of how the application program 29 handles these events is provided to illustrate the direct sending of pen events to the application, to contrast the conversion of the pen events to text by an input method 64 before sending the text to the application program 29. In FIG. 19, single taps are detected and result in setting the caret (steps 1900–1902), double-taps are interpreted and used to select the word proximate the tap (steps 1904–1906), while triple taps result in a line of text being selected (steps 1908–1910). Step 1912 handles selection via the drag operation. Note that user ink such as sketches may be selected in the text entry mode via the drag operation.

Figure 20:
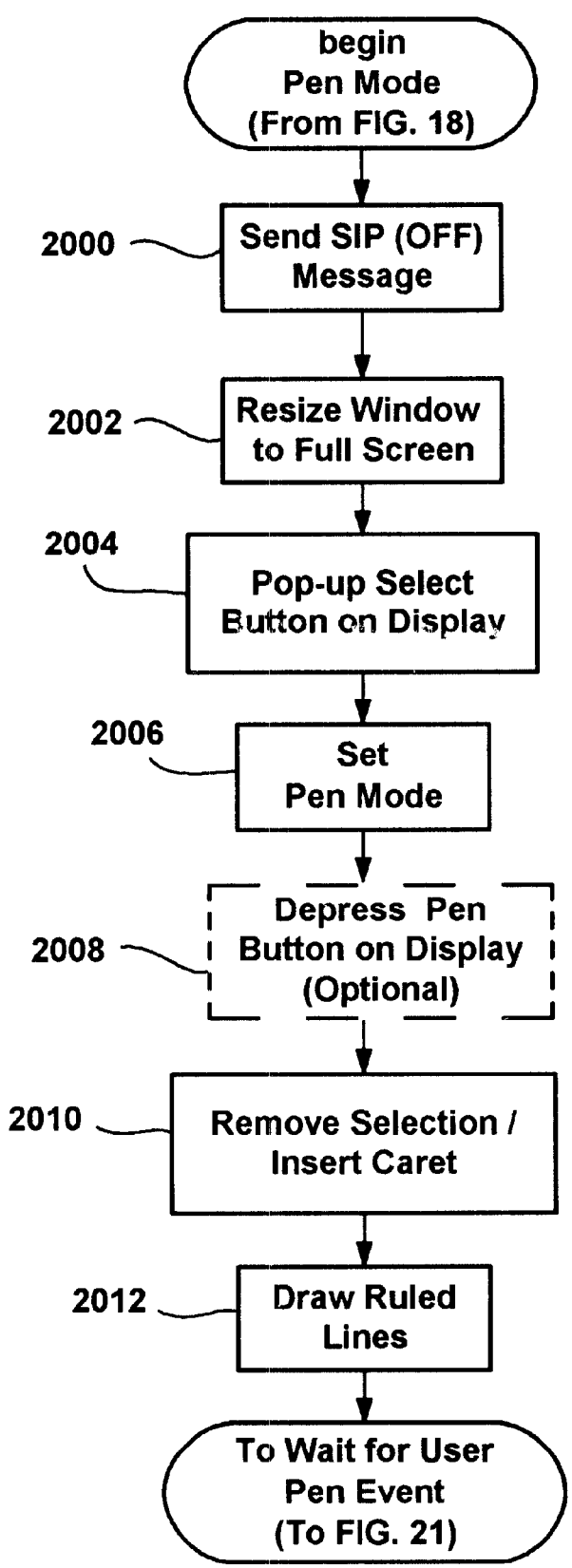
FIG. 20 is a flow diagram representing general steps taken to switch to the pen mode in accordance with an aspect of the present invention.

FIG. 20 generally shows the system operation when the pen mode is selected, such as when the SIP 50 is deselected (step 1802), as described above. At step 2000, a SIP "Off" message is sent, whereby as described above, the system will close the SIP window 50. When the application program 29 receives the "Off" message, the application program 29 resizes the application window 78 to its near-full screen rendering at step 2002, and at step 2004 restores the select mode button 90 to its popped-up position. Then, at step 2006, the pen mode will automatically be entered for the user to handle pen events directed to writing, in accordance with one aspect of the present invention and as described above. At step 2008, a pen button on the display optionally may be depressed to indicate the pen mode, (represented at step 2008 as optional by the dashed box). Note that such a pen button also may be used to manually switch between pen and text entry modes, if desired.

At step 2010, the insert caret 84 or marked selection box 86, whichever is present, is removed from the application window 78 by the application program 29, and at step 2012, the horizontal lines $80_1$–$80_6$ are drawn in their solid form. At this time, the system and application program 29 are ready for and awaiting user pen activity, as shown in FIG. 21.

Figure 21:
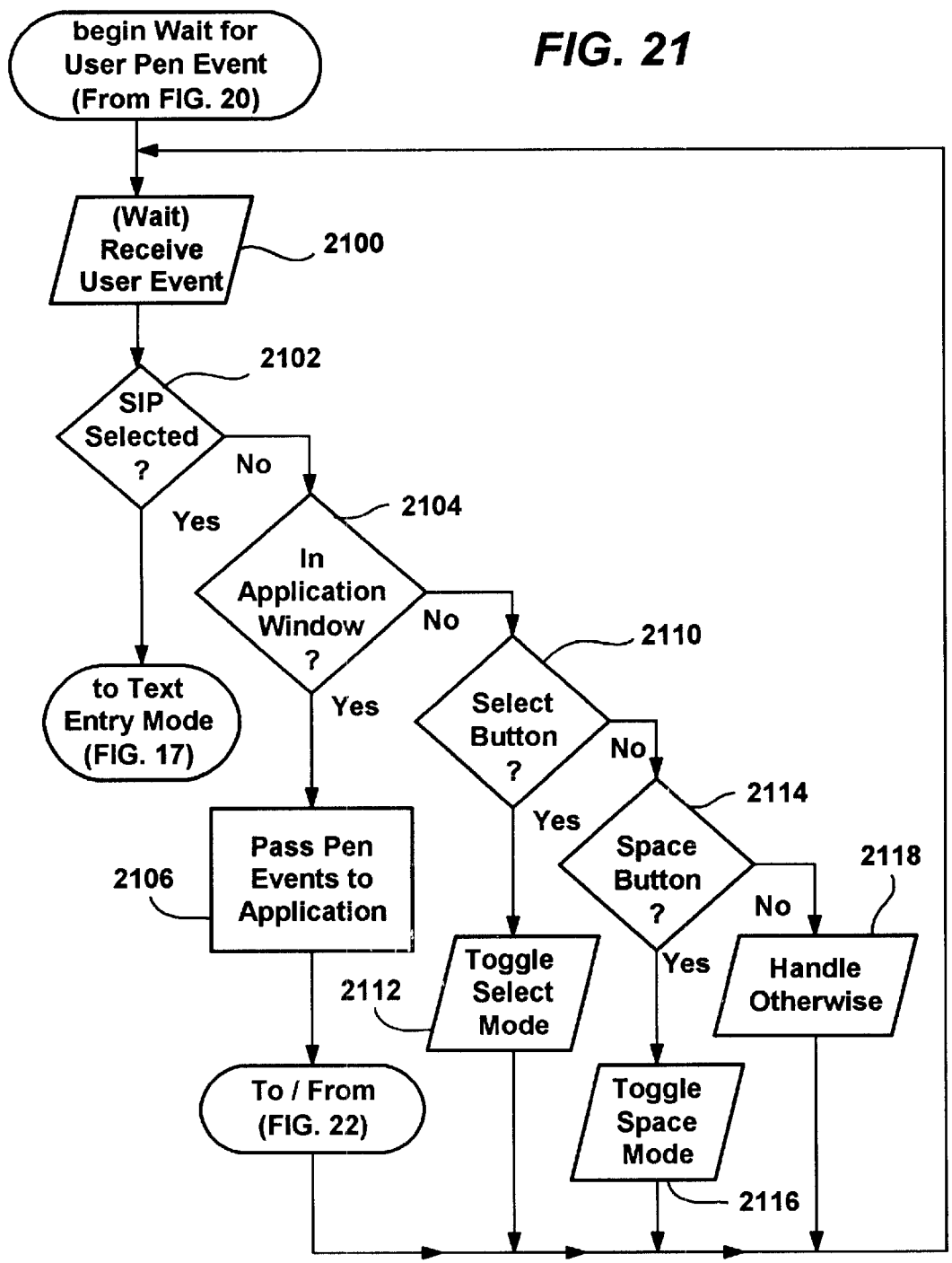
FIG. 21 is a flow diagram representing the detection and handling of pen events while in the pen mode in accordance with an aspect of the present invention.

As represented in FIG. 21 by step 2102, if the activity is the selection of a SIP/input method (via the button 52 or the button 70), the system and application program 29 automatically change to the text entry mode, in accordance with one aspect of the present invention and as described above. If not, steps 2104–2106 represent the action taken when the user's pen event or events occurred in the application window 78. At step 2106, the user activity is passed as pen events to the application, which then handles those events as shown in FIG. 22, depending on whether the pen mode is interpreting pen events as writing, or is in a writing/pen sub-mode, as described below.

If the user activity was not in the application's window, step 2110 represents the detection of whether the select button 82 was tapped, and if so, toggles the select mode from off to on or on to off. Note that the appearance of the button on the display is changed by step 2112, as will the appearance of the horizontal lines $80_1$–$80_6$. Similarly, if not the select button 82, step 2114 represents the event detection of whether the space insert button 90 was tapped. If so, step 2116 toggles the space mode from off to on or on to off and also changes the appearance of the button 90 on the display and the appearance of the horizontal lines $80_1$–$80_6$. Lastly, step 2118 illustrates the handling of other pen events, such as to close the application.

Figure 22:
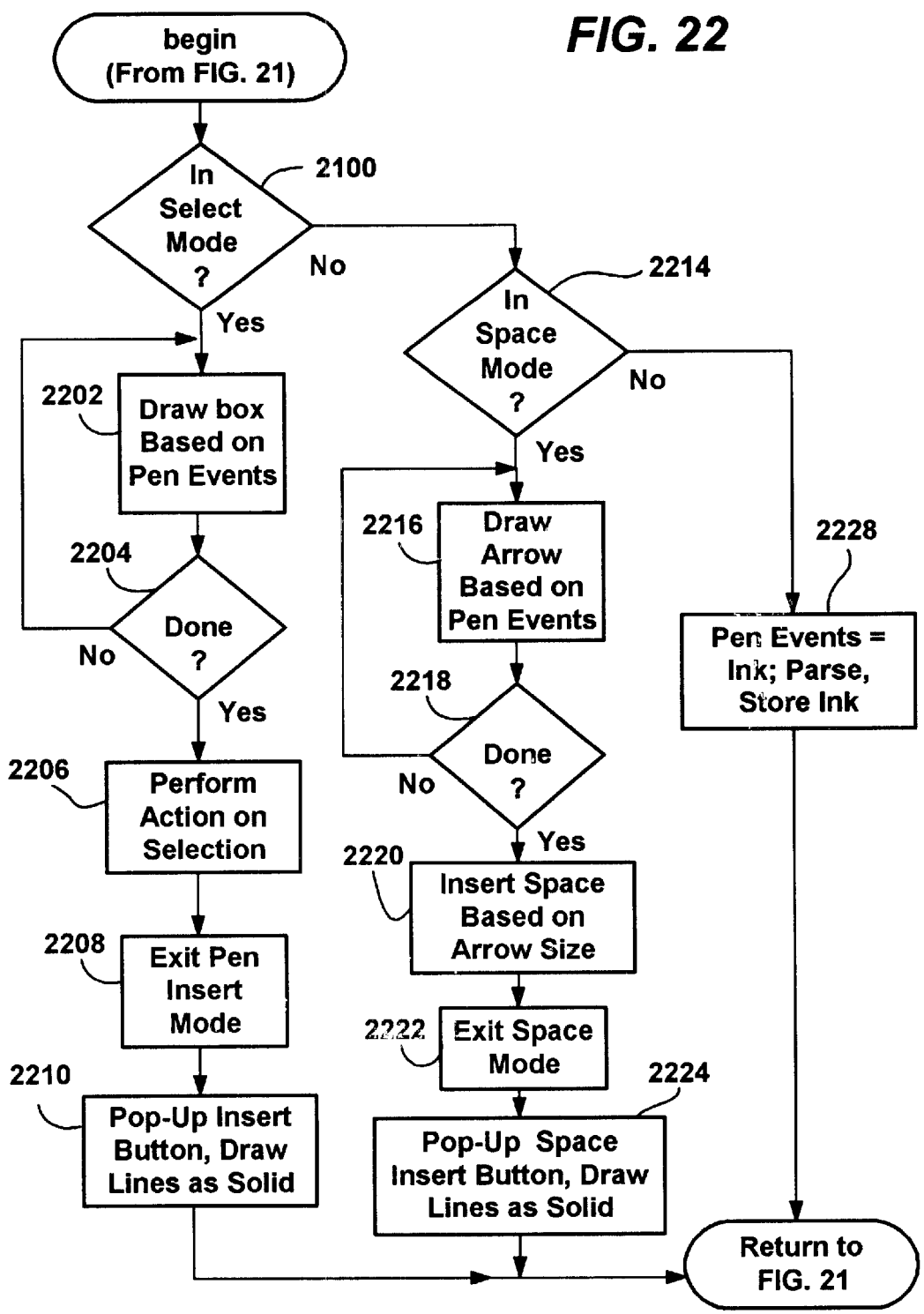
FIG. 22 is a flow diagram representing the handling of pen events detected in the application window while in the pen mode.

FIG. 22 generally shows how the application deals with pen events in the application window 78. At step 2200, if the select mode is presently active, the pen events are used to draw a box 88 (FIG. 10) around a selected area in the application window 78. Steps 2202 and 2204 draw the box 88 until the user is done, i.e., until the pen is lifted. Step 2206 the represents any action on the ink within the box 88 (such as deletion), while step 2210 exits the pen select mode since it is a one-shot operation and step 2212 restores the select button 82 and redraws the horizontal lines $80_1$–$80_6$ as solid to indicate that the select mode is no longer active.

If at step 2200, the select mode was not presently active, but instead the insert space mode is active at step 2214, the pen events are used to draw the arrow 92 (FIG. 14) beginning at the pen location in the application window 78. Steps 2216 and 2218 adjust the size of the arrow 92 until the user is done, i.e., until the pen is lifted. Step 2220 then inserts the appropriate amount of space based on the size of the arrow 92, while step 2222 exits the space mode since it is a one-shot operation and step 2224 restores the insert space button 90 and redraws the horizontal lines $80_1$–$80_6$ as solid to indicate that the space mode is no longer active.

Lastly, if in neither of the sub-modes, step 2228 treats the pen events as written ink, optionally parsing the ink to store it in a different form (e.g., as words). In this manner, the user is able to input writing and switch to an ink editing mode in a straightforward manner.

As can be seen from the foregoing detailed description, there is provided a method and system that merge writing and text input, based on the state of an intuitively selected soft input panel. The state determines whether an application is in a text entry or ink writing/pen mode. Visual feedback is provided, and sub-modes are managed so that only straightforward and intuitive user intervention is required.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. In a computer system, a method, comprising:

receiving input data directed to a displayed area corresponding to a program, wherein the displayed area includes at least a first area that remains visible when an input panel is in a selected state in which the input panel is displayed, determining a state of the input panel, and, without requiring further manual input directed to a mode change, if the input panel is in a non-selected state, automatically handling input data directed to the first area as events related to digital ink data, and if the input panel is in a selected state, automatically handling input data directed to the first area as events related to text editing.

2. The method of claim 1 wherein receiving input data comprises receiving pen events.

3. The method of claim 2 further comprising receiving the pen events at the program, and interpreting the pen events based on the state of at least one sub-mode of the program.

4. The method of claim 3 wherein the state of each sub-mode is disabled, wherein the input panel is in a non-selected state, and wherein interpreting the pen events comprises storing digital ink based on the pen events.

5. The method of claim 4 wherein a sub-mode is an insert space sub-mode in an enabled state, wherein the input panel is in a non-selected state, and wherein interpreting the pen events comprises inserting space in a window of the program.

6. The method of claim 4, wherein a sub-mode is a select sub-mode in an enabled state, wherein the input panel is in a non-selected state, and wherein interpreting the pen events comprises selecting an area of a window of the program.

7. The method of claim 6 further comprising performing at least one action on ink that is displayed in the area selected.

8. The method of claim 1 wherein the input panel is in the selected state, and further comprising, receiving other input data directed to the input panel, passing the other input data to an input method corresponding to the input panel, converting the other input data to text in the input method, and passing the text to the program.

9. A computer-readable medium having computer-executable instructions for performing the method of claim 5.

10. In a computer system, a method comprising:

receiving user input directed to a display area of a program, the display area having at least a first area that is visible when an input panel is in a selected state and is displayed, the first area being separate from a second area in which the input panel is displayed;

determining whether the input panel is in the selected state or a non-selected state; and when the input panel is in a deselected state, handling user input directed to the first area as pen events for entering digital ink data; and when the input panel is in a selected state, handling user input directed to the first area as pen events for editing text data, such that any text displayed in the first area may be edited by user input directed thereto.

11. The method of claim 10 wherein the input panel is selected and deselected external to the program, and further comprising, notifying the program upon changing the input panel from the selected state to the deselected state and upon changing the input panel from the deselected state to the selected state.

12. A computer-readable medium having computer-executable instructions for performing the method of claim 10.

* * * * *